US009867070B2

(12) United States Patent
Luo et al.

(10) Patent No.: US 9,867,070 B2
(45) Date of Patent: Jan. 9, 2018

(54) TECHNIQUES FOR REPORTING CHANNEL STATE INFORMATION (CSI) FOR AN UNLICENSED RADIO FREQUENCY SPECTRUM BAND

(71) Applicant: QUALCOMM Incorporated, San Diego, CA (US)

(72) Inventors: Tao Luo, San Diego, CA (US); Wanshi Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 67 days.

(21) Appl. No.: 14/567,573

(22) Filed: Dec. 11, 2014

(65) Prior Publication Data

US 2015/0245232 A1 Aug. 27, 2015

Related U.S. Application Data

(60) Provisional application No. 61/944,788, filed on Feb. 26, 2014.

(51) Int. Cl.
*H04W 24/08* (2009.01)
*H04W 72/04* (2009.01)
*H04L 5/00* (2006.01)
*H04L 27/00* (2006.01)
*H04L 25/02* (2006.01)

(52) U.S. Cl.
CPC ............ *H04W 24/08* (2013.01); *H04L 5/001* (2013.01); *H04L 27/0006* (2013.01); *H04W 72/0453* (2013.01); *H04L 25/0202* (2013.01)

(58) Field of Classification Search
None
See application file for complete search history.

(56) References Cited

U.S. PATENT DOCUMENTS

| 2006/0009161 A1* | 1/2006 | Beecher | H04W 28/18 455/67.11 |
| 2007/0002890 A1* | 1/2007 | Mangold | H04W 8/22 370/459 |
| 2011/0249578 A1* | 10/2011 | Nayeb Nazar | H04L 1/0027 370/252 |

(Continued)

FOREIGN PATENT DOCUMENTS

| EP | 2658160 A1 * | 10/2013 | ............. H04L 5/001 |
| WO | WO-2013185835 A1 | 12/2013 | |

OTHER PUBLICATIONS

ISA/EPO, International Search Report and Written Opinion of the International Searching Authority, Int'l. App. No. PCT/US2015/016031, dated Apr. 24, 2015, European Patent Office, Rijswijk, NL, 10 pgs.

(Continued)

*Primary Examiner* — Edan Orgad
*Assistant Examiner* — Saumit Shah
(74) *Attorney, Agent, or Firm* — Holland & Hart

(57) ABSTRACT

Techniques are described for wireless communication. One technique includes receiving a service via a component carrier, wherein the component carrier may be in an unlicensed radio frequency spectrum band. One or more signals transmitted on the component carrier may be measured to estimate channel state information of the component carrier in the unlicensed radio frequency spectrum band.

30 Claims, 19 Drawing Sheets

(56) References Cited

U.S. PATENT DOCUMENTS

| | | | |
|---|---|---|---|
| 2012/0076017 A1* | 3/2012 | Luo | H04L 1/0027 370/252 |
| 2012/0201207 A1* | 8/2012 | Liu | H04W 24/10 370/329 |
| 2013/0003668 A1* | 1/2013 | Xiao | H04L 5/001 370/329 |
| 2013/0201884 A1 | 8/2013 | Freda et al. | |
| 2014/0112300 A1* | 4/2014 | Han | H04W 24/04 370/329 |
| 2015/0163805 A1* | 6/2015 | Cattoni | H04W 72/0453 370/329 |
| 2015/0223241 A1* | 8/2015 | Cattoni | H04L 5/0044 370/329 |

OTHER PUBLICATIONS

IPEA/EPO, Second Written Opinion of the International Preliminary Examining Authority, Int'l. App. No. PCT/US2015/016031, Jan. 18, 2016, European Patent Office, Rijswijk, NL, 6 pgs.

* cited by examiner

TECHNIQUES FOR REPORTING CHANNEL STATE INFORMATION (CSI) FOR AN UNLICENSED RADIO FREQUENCY SPECTRUM BAND

CROSS REFERENCES

The present Application for Patent claims priority to U.S. Provisional Patent Application No. 61/944,788 by Luo et al., entitled "Techniques for Reporting Channel State Information (CSI) For An Unlicensed Radio Frequency Spectrum Band," filed Feb. 26, 2014, assigned to the assignee hereof, and which is hereby incorporated by reference in its entirety.

FIELD OF DISCLOSURE

The present disclosure, for example, relates to wireless communication systems, and more particularly to techniques for reporting channel state information (CSI) for an unlicensed radio frequency spectrum band.

BACKGROUND

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

By way of example, a wireless multiple-access communication system may include a number of base stations, each simultaneously supporting communication for multiple user equipments (UEs; e.g., mobile devices). A base station may communicate with UEs on downlink channels (e.g., for transmissions from a base station to a UE) and uplink channels (e.g., for transmissions from a UE to a base station).

Some modes of communication may enable communications with a UE over different radio frequency spectrum bands (e.g., a licensed radio frequency spectrum band and/or an unlicensed radio frequency spectrum band). With increasing data traffic in cellular networks, the offloading of at least some data traffic from a licensed radio frequency spectrum band to an unlicensed radio frequency spectrum band may provide a cellular operator with opportunities for enhanced data transmission capacity.

Prior to gaining access to and transmitting data over the unlicensed radio frequency spectrum band, a transmitting apparatus may, in some examples, perform a listen before talk (LBT) procedure to gain access to the unlicensed radio frequency spectrum band. An LBT procedure may include performing a clear channel assessment (CCA) to determine whether a particular channel of the unlicensed radio frequency spectrum band is available. When it is determined that the channel of the unlicensed radio frequency spectrum band is not available (e.g., because another device is already using the channel of the unlicensed radio frequency spectrum band), a clear channel assessment may be performed for the channel again at a later time.

When a base station performs a clear channel assessment and gains access to an unlicensed radio frequency spectrum band, it may assume that a UE will receive its transmission and respond appropriately. However, situations may arise when a base station does not win contention to access the unlicensed radio frequency spectrum band; when a UE incorrectly determines that a clear channel assessment performed by a base station has failed; or when a UE incorrectly determines that a clear channel assessment performed by a base station was successful. In these and other situations, a UE may respond to a base station in a manner that is unexpected and potentially ambiguous.

SUMMARY

The present disclosure, for example, relates to one or more techniques for reporting channel state information (CSI) for an unlicensed radio frequency spectrum band. When a clear channel assessment performed by a base station fails for a component carrier in an unlicensed radio frequency spectrum band, the one or more signals transmitted to estimate channel state information for the component carrier in the unlicensed radio frequency spectrum band may not exist (e.g., a valid measurement subframe may not exist). When a clear channel assessment performed by a base station succeeds for a component carrier in an unlicensed radio frequency spectrum band, but a UE incorrectly determines that it has failed, the UE may assume that the one or more signals transmitted to estimate channel state information for the component carrier in the unlicensed radio frequency spectrum band do not exist (e.g., a valid measurement subframe does not exist). In these and other situations, a UE may not transmit the channel state information that the base station expects (e.g., the UE may transmit channel state information corresponding to a different component carrier; the UE may not transmit current channel state information; or the UE may not transmit channel state information at all. As a result of the scenarios mentioned above, there may be ambiguity at a base station regarding whether and/or when channel state information is reported, as well as ambiguity regarding the component carrier(s) for which the channel state information is reported.

In a first set of illustrative examples, a method for wireless communication is described. In one example, the method may include receiving a service via a component carrier, wherein the component carrier may be in an unlicensed radio frequency spectrum band, and measuring one or more signals transmitted on the component carrier to estimate channel state information of the component carrier in the unlicensed radio frequency spectrum band.

In some examples, the method may include determining that a clear channel assessment failed for a frame for the component carrier. In these examples, and in some cases, the method may include aperiodically transmitting the channel state information of the component carrier, the one or more signals being measured during the frame for the component carrier. In other cases, the method may include omitting an aperiodic transmission of the channel state information for one or more subframes of the frame for the component carrier.

In some examples, the method may include receiving an aperiodic channel state information bit associated with the component carrier in the unlicensed radio frequency spectrum band. The aperiodic channel state information bit may indicate whether to aperiodically transmit the channel state information of the component carrier.

In some examples, the method may include receiving instructions as to whether channel state information for one or more subframes of a frame for the component carrier is to be omitted from an aperiodic transmission of the channel state information. In these examples, the component carrier may include a first component carrier and the method may also include receiving the instructions over a second component carrier.

In some examples, the method may include periodically transmitting the channel state information regardless of whether a clear channel assessment failed for a frame for the component carrier.

In some examples, the method may include determining whether a clear channel assessment failed for a frame for the component carrier, and periodically transmitting the channel state information. In these examples, the measuring one or more signals may include measuring one or more current signals when the clear channel assessment is determined to have succeeded for the frame and measuring one or more historic signals when the clear channel assessment is determined to have failed for the frame.

In some examples, the method may include periodically transmitting the channel state information. The channel state information may include an indication used to identify the component carrier associated with the channel state information. In some examples, the indication may explicitly identify the component carrier associated with the channel state information. In some examples, the indication may include a scrambling pattern associated with the component carrier associated with the channel state information. The scrambling pattern may include a first scrambling pattern when the channel state information is associated with a primary cell, and the scrambling pattern may include a second scrambling pattern when the channel state information is associated with a secondary cell. In some examples, the indication may include a rate matching for a multiplexed physical uplink control channel (PUCCH) and physical uplink shared channel (PUSCH). In some examples, the indication may include a resource location of a PUCCH.

In some examples, the method may include determining whether a condition is met, and periodically transmitting the channel state information. The channel state information may include an indication used to identify the component carrier associated with the channel state information when the condition is met. In some examples, the condition may be a same payload size for at least two alternate channel state information transmissions.

In some examples, the method may include determining whether a clear channel assessment failed for a frame for the component carrier, and periodically transmitting the channel state information. The channel state information may include an indication used to identify the component carrier associated with the channel state information when the clear channel assessment is determined to have failed.

In some examples of the method, the determining the clear channel assessment failed may be based at least in part on a channel usage beacon signal. In some examples of the method, the determining the clear channel assessment failed may be based at least in part on a reference signal for a channel state information report. In some examples of the method, the frame for the component carrier is a downlink frame or an uplink frame.

In a second set of illustrative examples, an apparatus for wireless communication is described. In one example, the apparatus may include means for receiving a service via a component carrier, wherein the component carrier may be in an unlicensed radio frequency spectrum band, and means for measuring one or more signals transmitted on the component carrier to estimate channel state information of the component carrier in the unlicensed radio frequency spectrum band. In some examples, the apparatus may further include means for implementing one or more aspects of the method for wireless communication described above with respect to the first set of illustrative examples.

In a third set of illustrative examples, another apparatus for wireless communication is described. In one example, the apparatus may include a processor, memory in electronic communication with the processor, and instructions stored in the memory. The instructions may be executable by the processor to receive a service via a component carrier, wherein the component carrier may be in an unlicensed radio frequency spectrum band, and to measure one or more signals transmitted on the component carrier to estimate channel state information of the component carrier in the unlicensed radio frequency spectrum band. In some examples, the instructions may also be executable by the processor to implement one or more aspects of the method for wireless communication described above with respect to the first set of illustrative examples.

In a fourth set of illustrative examples, a non-transitory computer-readable medium storing computer-executable code for wireless communications is described. In one example, the code may be executable by a processor to cause the wireless communication apparatus to receive a service via a component carrier, wherein the component carrier may be in an unlicensed radio frequency spectrum band, and to measure one or more signals transmitted on the component carrier to estimate channel state information of the component carrier in the unlicensed radio frequency spectrum band.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the spirit and scope of the appended claims. Features which are believed to be characteristic of the concepts disclosed herein, both as to their organization and method of operation, together with associated advantages will be better understood from the following description when considered in connection with the accompanying figures. Each of the figures is provided for the purpose of illustration and description only, and not as a definition of the limits of the claims.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Figure 1:
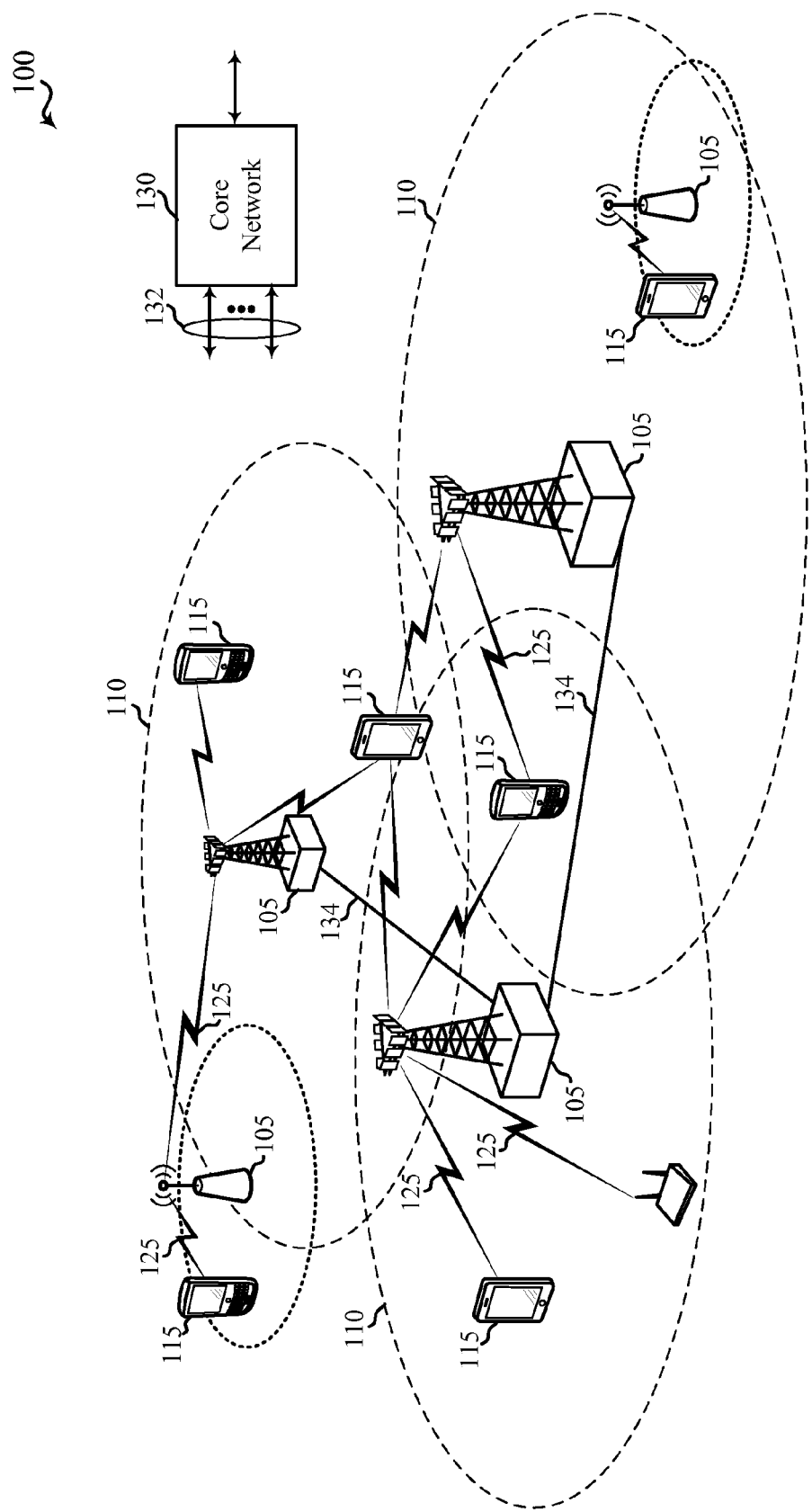
FIG. 1 shows a diagram of an example of a wireless communication system, in accordance with various aspects of the present disclosure.

Techniques are described in which channel state information for an unlicensed radio frequency spectrum band (e.g., a radio frequency spectrum band for which apparatuses may need to contend for access because the radio frequency spectrum band is available for unlicensed use, such as a Wi-Fi radio frequency spectrum band) may be reported to a base station in a less ambiguous or non-ambiguous manner.

In some examples, techniques to lessen or eliminate ambiguity in channel state information reporting may include receiving (e.g., from a base station) a service via a component carrier. The component carrier may be in an unlicensed radio frequency spectrum band. In some examples, the service (or one or more other services) may also be received via one or more additional component carriers in the unlicensed radio frequency spectrum band and/or one or more component carriers in a licensed radio frequency spectrum band. One or more signals transmitted on the component carrier may be measured to estimate channel state information of the component carrier in the unlicensed radio frequency spectrum band. The channel state information may then be transmitted (e.g., to the base station) in a manner that enables the channel state information to be understood (e.g., ambiguity in the nature of the channel state information may be lessened or eliminated). Techniques for lessening or removing ambiguity from channel state information may include, for example, transmitting the channel state information regardless of successful clear channel assessment to contend for access to a component carrier for a gating interval (e.g., a downlink frame); enabling a base station to configure one or more reporting options (e.g., whether a UE will transmit the channel state information regardless of successful clear channel assessment to contend for access to a component carrier for a gating interval; when channel state information is to be reported, etc.); transmitting the channel state information with an indication used to identify the component carrier associated with the channel state information. These and other techniques are described in greater detail with reference to FIGS. 5-8 and 10-18.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description below, however, describes an LTE system for purposes of example, and LTE terminology is used in much of the description below, although the techniques are applicable beyond LTE applications.

The following description provides examples, and is not limiting of the scope, applicability, or examples set forth in the claims. Changes may be made in the function and arrangement of elements discussed without departing from the spirit and scope of the disclosure. Various examples may omit, substitute, or add various procedures or components as appropriate. For instance, the methods described may be performed in an order different from that described, and various steps may be added, omitted, or combined. Also, features described with respect to certain examples may be combined in other examples.

FIG. 1 shows a diagram of an example of a wireless communication system 100, in accordance with various aspects of the present disclosure. The wireless communication system 100 may include base stations (or cells) 105, UEs 115, and a core network 130. The base stations 105 may communicate with the UEs 115 under the control of a base station controller (not shown), which may be part of the core network 130 or the base stations 105 in various examples. The base stations 105 may communicate control information and/or user data with the core network 130 through backhaul links 132. Backhaul links 132 may be wired backhaul links (e.g., copper, fiber, etc.) and/or wireless backhaul links (e.g., microwave, etc.). In some examples, the base stations 105 may communicate, either directly or indirectly, with each other over backhaul links 134, which may be wired or wireless communication links. The wireless communication system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the UEs 115 via one or more base station antennas. Each of the base stations 105 may provide communication coverage for a respective coverage area 110. In some examples, a base station 105 may be referred to as an access point, a base transceiver station (BTS), a radio base station, a radio transceiver, a basic service set (BSS), an extended service set (ESS), a NodeB, an evolved NodeB (eNB), a Home NodeB, a Home eNodeB, a WLAN access point, a Wi-Fi node or some other suitable terminology. The coverage area 110 for a base station 105 may be divided into sectors making up only a portion of the coverage area. The wireless communication system 100 may include base stations 105 of different types (e.g., macro, micro, and/or pico base stations). The base stations 105 may also utilize different radio technologies, such as cellular and/or WLAN radio access technologies. The base stations 105 may be associated with the same or different access networks or operator deployments. The coverage areas of different base stations 105, including the coverage areas of the same or different types of base stations 105, utilizing the same or different radio technologies, and/or belonging to the same or different access networks, may overlap.

The UEs 115 may be dispersed throughout the wireless communication system 100. A UE 115 may also be referred to by those skilled in the art as a mobile device, a mobile station, a subscriber station, a mobile unit, a subscriber unit, a wireless unit, a remote unit, a wireless device, a wireless communication device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wearable item such as a watch or glasses, a wireless local loop (WLL) station, or the like. A UE 115 may be able to communicate with macro base stations, pico base stations, femto base stations, relay base stations, and the like. A UE 115 may also be able to communicate over different types of access networks, such as cellular or other WWAN access networks, or WLAN access networks. In some modes of communication with a UE 115, communication may be conducted over a plurality of communication links 125 or channels, with each channel using a component carrier between the UE 115 and one of a number of cells (e.g., serving cells, which cells may in some cases be operated by the same or different base stations 105).

Each component carrier may be provided over a licensed radio frequency spectrum band or an unlicensed radio frequency spectrum band, and a set of component carriers used in a particular mode of communication may all be received (e.g., at a UE 115) over a licensed radio frequency spectrum band, all be received (e.g., at a UE 115) over an unlicensed radio frequency spectrum band, or be received (e.g., at a UE 115) over a combination of a licensed radio frequency spectrum band and an unlicensed radio frequency spectrum band.

The communication links 125 shown in wireless communication system 100 may include uplink channels (using component carriers) for carrying uplink (UL) communications (e.g., transmissions from a UE 115 to a base station 105) and/or downlink channels (using component carriers) for carrying downlink (DL) communications (e.g., transmissions from a base station 105 to a UE 115). The UL communications or transmissions may also be called reverse link communications or transmissions, while the DL communications or transmissions may also be called forward link communications or transmissions. The downlink communications and/or uplink communications may be made using a licensed radio frequency spectrum band, an unlicensed radio frequency spectrum band, or both.

In some examples, the wireless communication system 100 may be or include an LTE/LTE-A network. In LTE/LTE-A networks, the terms evolved Node B (eNB) may be generally used to describe individual ones or groups of the base stations 105. The wireless communication system 100 may be a Heterogeneous LTE/LTE-A network in which different types of eNBs provide coverage for various geographical regions. For example, each eNB may provide communication coverage for a macro cell, a pico cell, a femto cell, and/or other type of cell. A macro cell may generally cover a relatively large geographic area (e.g., several kilometers in radius) and may allow unrestricted access by UEs 115 having service subscriptions with the network provider. A pico cell may generally cover a relatively smaller geographic area and may allow unrestricted access by UEs 115 with service subscriptions with the network provider. A femto cell may also generally cover a relatively small geographic area (e.g., a home) and, in addition to unrestricted access, may also provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The wireless communication system 100 according to an LTE/LTE-A network architecture may be referred to as an Evolved Packet System (EPS). An EPS may include one or more UEs 115, an Evolved UMTS Terrestrial Radio Access Network (E-UTRAN), an Evolved Packet Core (EPC) (e.g., core network 130), a Home Subscriber Server (HSS), and an Operator's IP Services. The EPS may interconnect with other access networks using other Radio Access Technologies. For example, the EPS may interconnect with a UTRAN-based network and/or a CDMA-based network via one or more Serving GPRS Support Nodes (SGSNs). To support mobility of UEs 115 and/or load balancing, the EPS may support handover of UEs 115 between a source eNB (or base station 105) and a target eNB (or base station 105). The EPS may support intra-RAT handover between eNBs and/or base stations 105 of the same RAT (e.g., other E-UTRAN networks), and inter-RAT handovers between eNBs and/or base stations 105 of different RATs (e.g., E-UTRAN to CDMA, etc.). The EPS may provide packet-switched services, however, as those skilled in the art will readily appreciate, the various concepts presented throughout this disclosure may be extended to networks providing circuit-switched services.

The E-UTRAN may include eNBs and may provide user plane and control plane protocol terminations toward the UEs 115. The eNBs and/or base stations 105 may be connected to other eNBs and/or base stations 105 via backhaul link 134 (e.g., an X2 interface and/or the like). The eNBs and/or base stations 105 may provide access points to the EPC (e.g., the core network 130) for the UEs 115. The eNBs and/or base stations 105 may be connected by backhaul link 132 (e.g., an S1 interface and/or the like) to the EPC. Logical nodes within the EPC may include one or more Mobility Management Entities (MMEs), one or more Serving Gateways, and one or more Packet Data Network (PDN) Gateways (not shown). Generally, the MME may provide bearer and connection management. All user IP packets may be transferred through the Serving Gateway, which itself may be connected to the PDN Gateway. The PDN Gateway may provide UE IP address allocation as well as other functions. The PDN Gateway may be connected to IP networks and/or the Operator's IP Services. These logical nodes may be implemented in separate physical nodes or one or more logical nodes may be combined in a single physical node. The IP Networks/Operator's IP Services may include the Internet, an Intranet, an IP Multimedia Subsystem (IMS), and/or a Packet-Switched (PS) Streaming Service (PSS).

UEs 115 and eNBs or base stations 105 may be configured to collaboratively communicate through, for example, Multiple Input Multiple Output (MIMO), Coordinated Multi-Point (CoMP), or other schemes. MIMO techniques use multiple antennas on a base station 105 and/or multiple antennas on a UE 115 to take advantage of multipath environments to transmit multiple data streams. CoMP includes techniques for dynamic coordination of transmission and reception by a number of eNBs and/or base stations 105 to improve overall transmission quality for UEs 115, as well as to increase network and spectrum utilization. Generally, CoMP techniques may utilize backhaul links 132 and/or 134 for communication between base stations 105 to coordinate control plane and user plane communications for the UEs 115.

The communication networks that may accommodate some of the various disclosed techniques may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use hybrid automatic repeat request (HARQ) techniques to provide retransmission at the MAC layer to ensure reliable data transmission. In the control plane, the Radio Resource Control (RRC) protocol layer may provide establishment, configuration, and maintenance of an RRC connection between the UE and the network used for the user plane data. At the Physical layer, the transport channels may be mapped to physical channels.

The downlink physical channels may include at least one of a physical downlink control channel (PDCCH), a physical HARQ indicator channel (PHICH), and a physical downlink shared channel (PDSCH). The uplink physical channels may include at least one of a physical uplink control channel (PUCCH) and a physical uplink shared channel (PUSCH). The PDCCH may carry downlink control information (DCI), which may indicate data transmissions for UEs on the PDSCH as well as provide UL resource grants to UEs for the PUSCH. The UE may transmit control information in the PUCCH on the assigned resource blocks in the control section. The UE may transmit only data or both data and control information in the PUSCH on the assigned resource blocks in the data section.

LTE/LTE-A utilizes orthogonal frequency division multiple-access (OFDMA) on the downlink and single-carrier frequency division multiple-access (SC-FDMA) on the uplink. An OFDMA and/or SC-FDMA carrier may be partitioned into multiple (K) orthogonal subcarriers, which are also commonly referred to as tones, bins, or the like. Each subcarrier may be modulated with data. The spacing between adjacent subcarriers may be fixed, and the total number of subcarriers (K) may be dependent on the system bandwidth. For example, K may be equal to 72, 180, 300, 600, 900, or 1200 with a subcarrier spacing of 15 kilohertz (KHz) for a corresponding system bandwidth (with guard band) of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands.

In some examples of the wireless communication system 100, LTE/LTE-A may be deployed under different scenarios using an unlicensed radio frequency spectrum band. The deployment scenarios may include a supplemental downlink mode in which LTE/LTE-A downlink communications in a licensed radio frequency spectrum band may be offloaded to an unlicensed radio frequency spectrum band, a carrier aggregation mode in which both LTE/LTE-A downlink and uplink communications may be offloaded from a licensed radio frequency spectrum band to an unlicensed radio frequency spectrum band, and a standalone mode in which LTE/LTE-A downlink and uplink communications between an eNB and/or base station and a UE may take place in an unlicensed radio frequency spectrum band. Base stations 105 as well as UEs 115 may support one or more of these or similar modes of operation. OFDMA waveforms may be used in the communication links 125 for LTE/LTE-A downlink communications in the licensed radio frequency spectrum band and/or the unlicensed radio frequency spectrum band, while OFDMA, SC-FDMA and/or resource block interleaved FDMA waveforms may be used in the communication links 125 for LTE/LTE-A uplink communications in the licensed radio frequency spectrum band and/or unlicensed radio frequency spectrum band.

Figure 2:
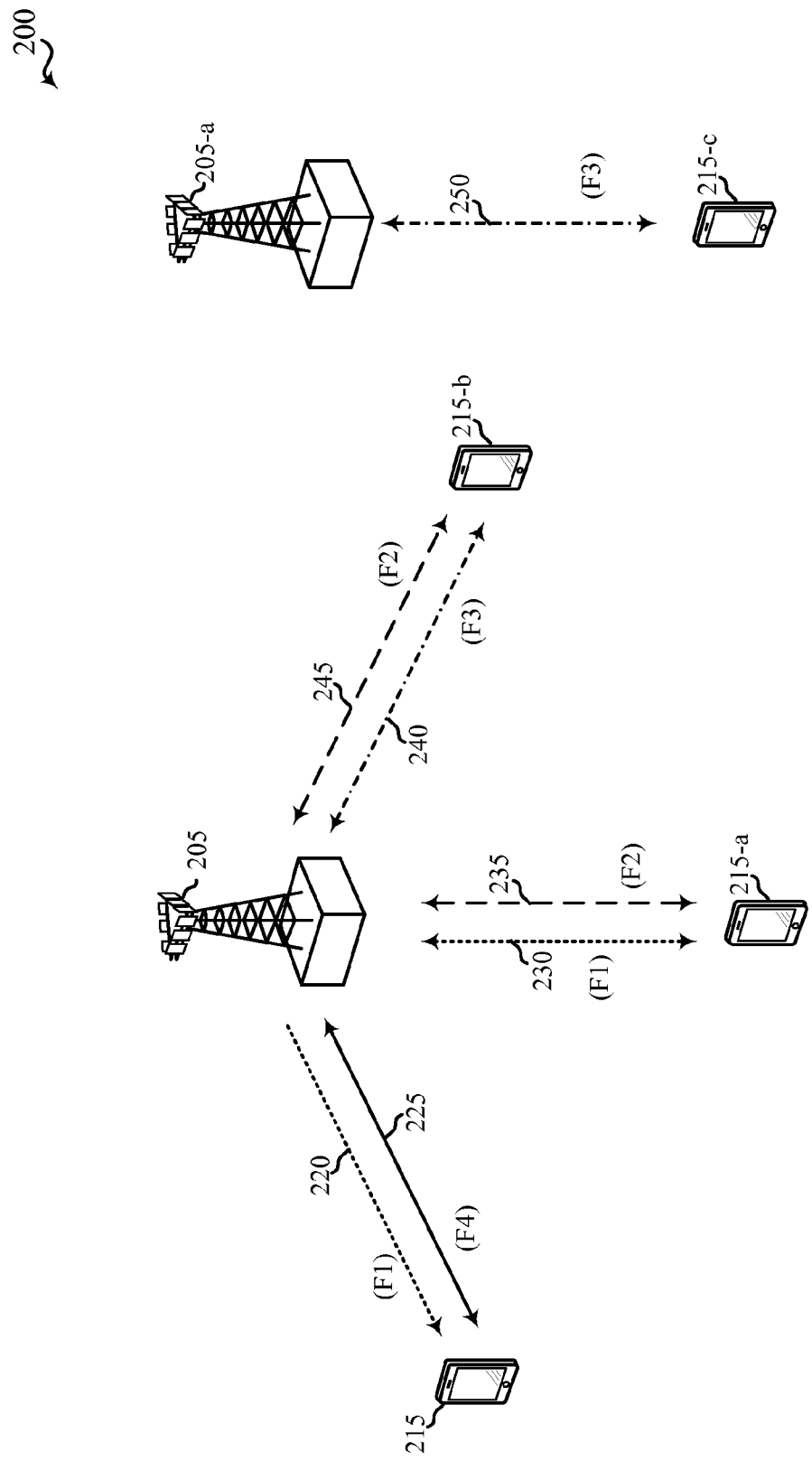
FIG. 2 shows a wireless communication system in which LTE/LTE-A is deployed under different scenarios using an unlicensed radio frequency spectrum band, in accordance with various aspects of the present disclosure.

FIG. 2 shows a wireless communication system 200 in which LTE/LTE-A is deployed under different scenarios using an unlicensed radio frequency spectrum band, in accordance with various aspects of the present disclosure. More specifically, FIG. 2 illustrates examples of a supplemental downlink mode, a carrier aggregation mode, and a standalone mode in which LTE/LTE-A is deployed using an unlicensed radio frequency spectrum band. The wireless communication system 200 may be an example of portions of the wireless communication system 100 described with reference to FIG. 1. Moreover, a first base station 205 and a second base station 205-*a* may be examples of aspects of one or more of the base stations 105 described with reference to FIG. 1, while a first UE 215, a second UE 215-*a*, a third UE 215-*b*, and a fourth UE 215-*c* may be examples of aspects of one or more of the UEs 115 described with reference to FIG. 1.

In the example of a supplemental downlink mode in the wireless communication system 200, the first base station 205 may transmit OFDMA waveforms to the first UE 215 using a downlink channel 220. The downlink channel 220 may be associated with a frequency F1 in an unlicensed radio frequency spectrum band. The first base station 205 may transmit OFDMA waveforms to the first UE 215 using a first bidirectional link 225 and may receive SC-FDMA waveforms from the first UE 215 using the first bidirectional link 225. The first bidirectional link 225 may be associated with a frequency F4 in a licensed radio frequency spectrum band. The downlink channel 220 in the unlicensed radio frequency spectrum band and the first bidirectional link 225 in the licensed radio frequency spectrum band may operate concurrently. The downlink channel 220 may provide a downlink capacity offload for the first base station 205. In some examples, the downlink channel 220 may be used for unicast services (e.g., addressed to one UE) or for multicast services (e.g., addressed to several UEs). This scenario may occur with any service provider (e.g., an MNO) that uses a licensed radio frequency spectrum band and needs to relieve some of the traffic and/or signaling congestion.

In one example of a carrier aggregation mode in the wireless communication system 200, the first base station 205 may transmit OFDMA waveforms to the second UE 215-*a* using a second bidirectional link 230 and may receive OFDMA waveforms, SC-FDMA waveforms, and/or resource block interleaved FDMA waveforms from the second UE 215-*a* using the second bidirectional link 230. The second bidirectional link 230 may be associated with the frequency F1 in the unlicensed radio frequency spectrum band. The first base station 205 may also transmit OFDMA waveforms to the second UE 215-*a* using a third bidirectional link 235 and may receive SC-FDMA waveforms from the second UE 215-*a* using the third bidirectional link 235. The third bidirectional link 235 may be associated with a frequency F2 in a licensed radio frequency spectrum band. The second bidirectional link 230 may provide a downlink and uplink capacity offload for the first base station 205. Like the supplemental downlink described above, this scenario may occur with any service provider (e.g., MNO) that uses a licensed radio frequency spectrum and needs to relieve some of the traffic and/or signaling congestion.

In another example of a carrier aggregation mode in the wireless communication system 200, the first base station 205 may transmit OFDMA waveforms to the third UE 215-*b* using a fourth bidirectional link 240 and may receive OFDMA waveforms, SC-FDMA waveforms, and/or resource block interleaved waveforms from the third UE 215-*b* using the fourth bidirectional link 240. The fourth bidirectional link 240 may be associated with a frequency F3 in the unlicensed radio frequency spectrum band. The first base station 205 may also transmit OFDMA waveforms to the third UE 215-*b* using a fifth bidirectional link 245 and may receive SC-FDMA waveforms from the third UE 215-*b* using the fifth bidirectional link 245. The fifth bidirectional link 245 may be associated with the frequency F2 in the licensed radio frequency spectrum band. The fourth bidirectional link 240 may provide a downlink and uplink capacity offload for the first base station 205. This example and those provided above are presented for illustrative purposes and there may be other similar modes of operation or deployment scenarios that combine LTE/LTE-A in a licensed radio frequency spectrum band and an unlicensed radio frequency spectrum band for capacity offload.

As described above, one type of service provider that may benefit from the capacity offload offered by using LTE/LTE-A in an unlicensed radio frequency spectrum band is a traditional MNO having access rights to an LTE/LTE-A licensed radio frequency spectrum band. For these service providers, an operational example may include a bootstrapped mode (e.g., supplemental downlink, carrier aggregation) that uses the LTE/LTE-A primary component carrier (PCC) on the licensed radio frequency spectrum band and at least one secondary component carrier (SCC) on the unlicensed radio frequency spectrum band.

In the carrier aggregation mode, data and control may, for example, be communicated in the licensed radio frequency spectrum band (e.g., via first bidirectional link 225, third bidirectional link 235, and fifth bidirectional link 245) while data may, for example, be communicated in the unlicensed radio frequency spectrum band (e.g., via second bidirectional link 230 and fourth bidirectional link 240). The carrier aggregation mechanisms supported when using an unlicensed radio frequency spectrum band may fall under a hybrid frequency division duplexing-time division duplexing (FDD-TDD) carrier aggregation or a TDD-TDD carrier aggregation with different symmetry across component carriers.

In one example of a standalone mode in the wireless communication system 200, the second base station 205-*a* may transmit OFDMA waveforms to the fourth UE 215-*c* using a bidirectional link 250 and may receive OFDMA waveforms, SC-FDMA waveforms, and/or resource block interleaved FDMA waveforms from the fourth UE 215-*c* using the bidirectional link 250. The bidirectional link 250 may be associated with the frequency F3 in an unlicensed radio frequency spectrum band. The standalone mode may be used in non-traditional wireless access scenarios, such as in-stadium access (e.g., unicast, multicast). An example of a type of service provider for this mode of operation may be a stadium owner, cable company, event host, hotel, enterprise, or large corporation that does not have access to a licensed radio frequency spectrum band.

In some examples, a transmitting apparatus such as one of the base stations 105 and/or 205 described with reference to FIGS. 1 and/or 2, and/or one of the UEs 115 and/or 215 described with reference to FIGS. 1 and/or 2, may use a gating interval to gain access to a channel of an unlicensed radio frequency spectrum band (e.g., to a physical channel of the unlicensed radio frequency spectrum band). The gating interval may define the application of a contention-based protocol, such as an LBT protocol based on the LBT protocol specified in ETSI (EN 301 893). When using a gating interval that defines the application of an LBT protocol, the gating interval may indicate when a transmitting apparatus needs to perform a CCA. The outcome of the CCA may indicate to the transmitting device whether a channel of an unlicensed radio frequency spectrum band is available or in use for the gating interval (also referred to as an LBT frame). When a CCA indicates that the channel is available (e.g., "clear" for use) for a corresponding LBT frame, the transmitting apparatus may reserve and/or use the channel of the unlicensed radio frequency spectrum band during part or all of the LBT frame. When the CCA indicates that the channel is not available (e.g., that the channel is in use or reserved by another apparatus), the transmitting apparatus may be prevented from using the channel during the LBT frame.

In some cases, it may be useful for a transmitting apparatus to generate a gating interval on a periodic basis and synchronize at least one boundary of the gating interval with at least one boundary of a periodic frame structure. For example, it may be useful to generate a periodic gating interval for a cellular downlink in an unlicensed radio frequency spectrum band, and to synchronize at least one boundary of the periodic gating interval with at least one boundary of a periodic frame structure (e.g., a periodic LTE/LTE-A radio frame structure) associated with the cellular downlink. Examples of such synchronization are shown in FIG. 3.

Figure 3:
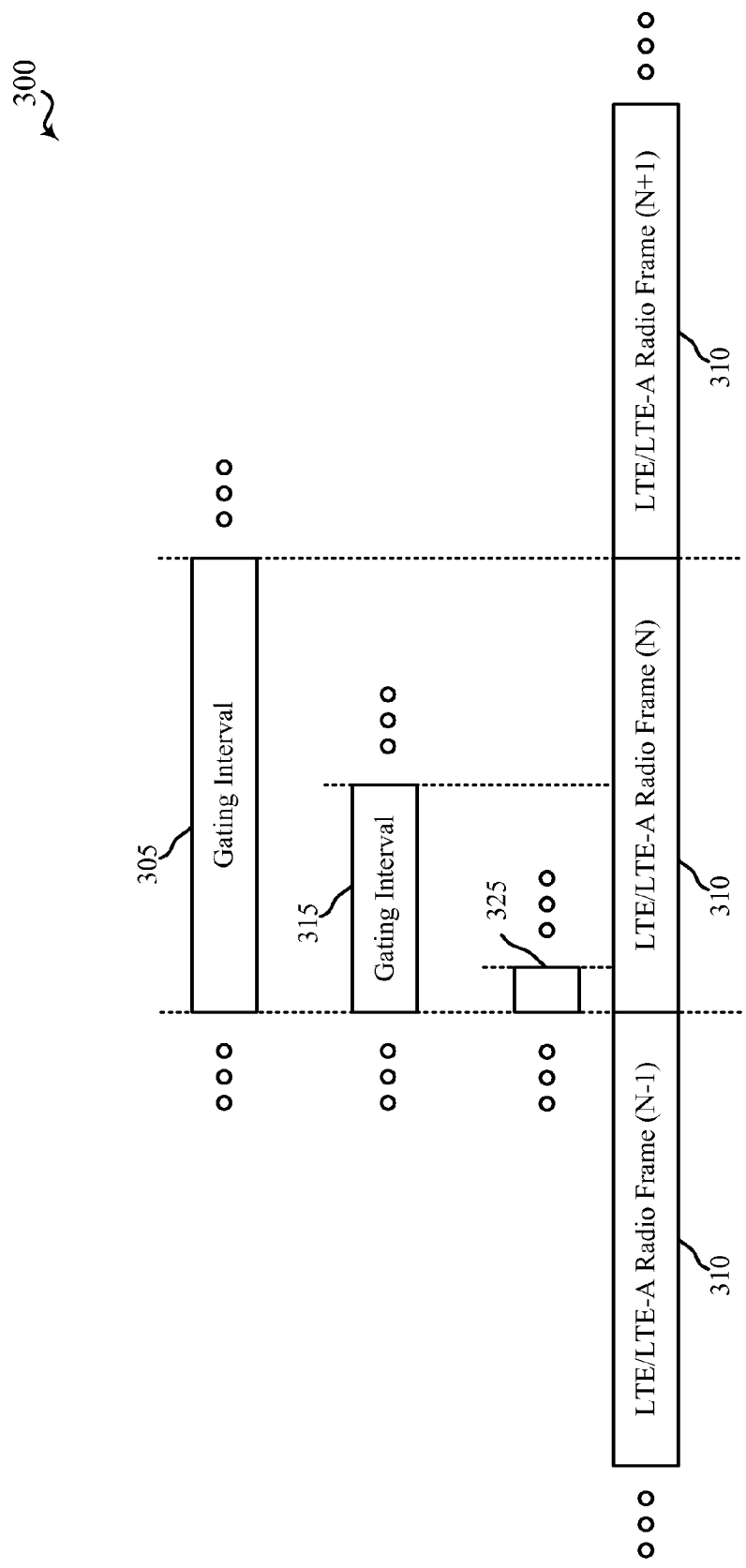
FIG. 3 shows examples of a gating interval (or LBT frame) for a cellular downlink in an unlicensed radio frequency spectrum band, in accordance with various aspects of the present disclosure.

FIG. 3 shows examples 300 of a gating interval (or LBT frame) for a cellular downlink in an unlicensed radio frequency spectrum band, in accordance with various aspects of the present disclosure. The first gating interval 305, the second gating interval 315, and/or the third gating interval 325 may be used as a periodic gating interval by an eNB that supports transmissions over the unlicensed radio frequency spectrum band. Examples of such an eNB may include the base stations 105 and/or 205 described with reference to FIGS. 1 and/or 2. The first gating interval 305, the second gating interval 315, and/or the third gating interval 325 may be used with the wireless communication system 100 and/or 200 described with reference to FIGS. 1 and/or 2.

By way of example, the duration of a first gating interval 305 is shown to be equal to (or approximately equal to) a duration of an LTE/LTE-A radio frame 310 of a periodic frame structure associated with a cellular downlink. In some examples, "approximately equal" means the duration of the first gating interval 305 is within a cyclic prefix (CP) duration of the duration of the periodic frame structure.

At least one boundary of the first gating interval 305 may be synchronized with at least one boundary of the periodic frame structure that includes the LTE/LTE-A radio frames N−1 to N+1. In some cases, the first gating interval 305 may have boundaries that are aligned with the frame boundaries of the periodic frame structure. In other cases, the first gating interval 305 may have boundaries that are synchronized with, but offset from, the frame boundaries of the periodic frame structure. For example, the boundaries of the first gating interval 305 may be aligned with subframe boundaries of the periodic frame structure, or with subframe midpoint boundaries (e.g., the midpoints of particular subframes) of the periodic frame structure.

In some cases, the periodic frame structure may include LTE/LTE-A radio frames N−1 to N+1. Each LTE/LTE-A radio frame 310 may have a duration of ten milliseconds, for example, and the first gating interval 305 may also have a duration of ten milliseconds. In these cases, the boundaries of the first gating interval 305 may be synchronized with the boundaries (e.g., frame boundaries, subframe boundaries, or subframe midpoint boundaries) of one of the LTE/LTE-A radio frames (e.g., the LTE/LTE-A radio frame (N)).

By way of example, the durations of a second gating interval 315 and a third gating interval 325 are shown to be sub-multiples of (or approximate sub-multiples of) the duration of the periodic frame structure associated with the cellular downlink. In some examples, an "approximate sub-multiple of" means the duration of the second gating interval 315 and/or the third gating interval 325 is within a cyclic prefix (CP) duration of the duration of a sub-multiple of (e.g., half or one-tenth) the periodic frame structure. For example, the second gating interval 315 may have a duration of five milliseconds and the third gating interval 325 may have a duration of two milliseconds. The second gating interval 315 or the third gating interval 325 may be advantageous over the first gating interval 305 because of its shorter duration may facilitate more frequent sharing of an unlicensed radio frequency spectrum band.

Figure 4A:
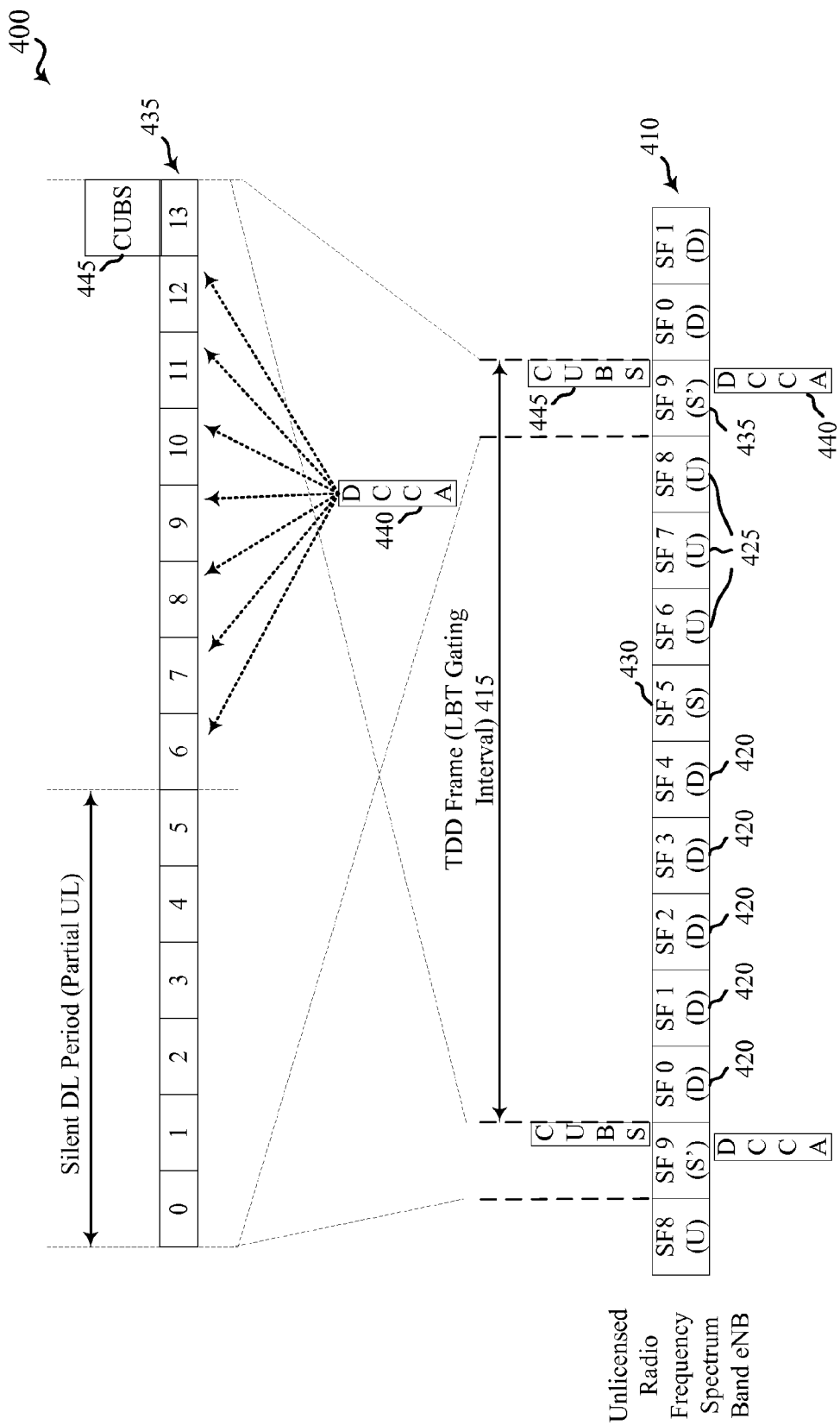
FIG. 4A shows an example of a wireless communication over an unlicensed radio frequency spectrum band, in accordance with various aspects of the present disclosure.

FIG. 4A shows an example 400 of a wireless communication 410 over an unlicensed radio frequency spectrum band, in accordance with various aspects of the present disclosure. A TDD frame 415, which may correspond to an LBT gating interval, may have a duration of 10 milliseconds and include a number of downlink subframes 420, a number of uplink subframes 425, and two types of special subframes, an S subframe 430 and an S' subframe 435. The S subframe 430 may provide a transition between downlink subframes 420 and uplink subframes 425, while the S' subframe 535 may provide a transition between uplink subframes 425 and downlink subframes 420. During the S' subframe 435, a downlink clear channel assessment (DCCA) 440 may be performed by one or more base stations, such as one or more of the base stations 105 and/or 205 described with reference to FIGS. 1 and/or 2, to reserve, for a period of time, the channel over which the wireless communication 410 occurs. Following a successful DCCA 440 by a base station, the base station may transmit a channel usage beacon signal (CUBS) 445 to provide an indication to other base stations and/or apparatuses that the base station has reserved the channel.

The S' subframe 435 may include 14 OFDM symbols, numbered 0 through 13 in FIG. 4A. A first portion of the S' subframe 435, symbols 0 through 5 in this example, may be used by base stations as a silent DL period, which may be required for compatibility with LTE/LTE-A communication standards. Thus, a base station may not transmit data during the silent DL period, although a UE may transmit some amount of uplink data during the silent DL period. A second portion of the S' subframe 435 may be used for a DCCA 440. In the example 400, the S' subframe 435 includes seven DCCA slots, included in symbols 6 through 12. Use of the DCCA slots by different network operators may be coordinated to provide more efficient system operation. In some examples, in order to determine which of the seven possible DCCA slots to use to perform a DCCA procedure, a base station 105 may evaluate a mapping-function of the form:

$$F_D(\text{GroupID}, t) \in \{1,2,3,4,5,6,7\}$$

where GroupID is a "deployment group-id" assigned to the base station 105, and t is the LBT frame number corresponding to a gating interval or frame for which DCCA is performed.

Figure 4B:
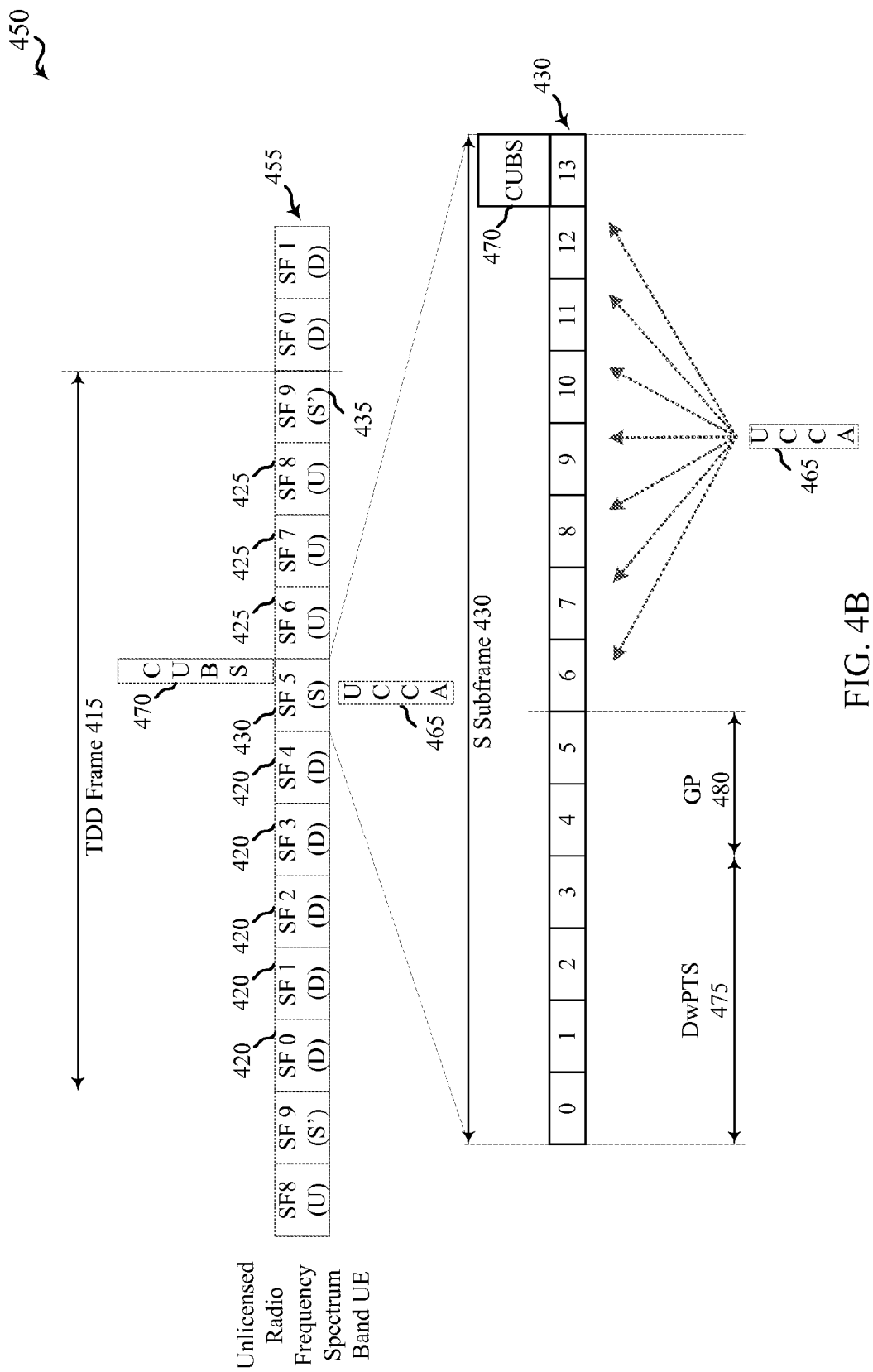
FIG. 4B shows an example of a wireless communication over an unlicensed radio frequency spectrum band, in accordance with various aspects of the present disclosure.

FIG. 4B shows an example 450 of a wireless communication 455 over an unlicensed radio frequency spectrum band, in accordance with various aspects of the present disclosure. A TDD frame 415, which may correspond to the LBT frame period of FIG. 4A, and may correspond to an LBT fixed frame period, may include a number of downlink subframes 420, a number of uplink subframes 425, and two types of special subframes (e.g., an S subframe 530 and an S' subframe 435. As discussed above, the S subframe 430 may provide a transition between downlink subframes 420 and uplink subframes 425, while the S' subframe 435 may provide a transition between uplink subframes 425 and downlink subframes 420. During the S subframe 430, an uplink CCA (UCCA) 565 may be performed by one or more UEs, such as one or more of the UEs 115 and/or 215 described above with reference to FIGS. 1 and/or 2, to reserve, for a period of time, the channel over which the wireless communication 455 occurs. Following a successful UCCA 465 by a UE, the UE may transmit a channel usage beacon signal (CUBS) 470 to provide an indication to other UEs and/or apparatuses that the UE has reserved the channel.

The S subframe 430 may include 14 OFDM symbols, numbered 0 through 13 in FIG. 4B. A first portion of the S subframe 430, symbols 0 through 3 in this example, may be used as a downlink pilot time slot (DwPTS) 475, and a second portion of the S subframe 430 may be used as a guard period (GP) 480. A third portion of the S subframe 430 may be used for UCCA 465. In the example 450, the S subframe 430 includes seven U-LBT slots, included in symbols 6 through 12. Use of the U-LBT slots by different UEs may be coordinated to provide more efficient system operation. In some examples, in order to determine which of the seven possible UCCA slots to use to perform a UCCA, a UE may evaluate a mapping-function of the form:

$$F_U(GroupID, t) \in \{1,2,3,4,5,6,7\}$$

where GroupID is a "deployment group-id" assigned to the UE, and t is the LBT frame number corresponding to a frame for which a UCCA is performed.

The mapping function for a DCCA and/or a UCCA may be constructed based on different criteria, depending on whether the mapping function will have an orthogonalization or a non-orthogonalization property. In examples with orthogonal LBT access, the mapping function may have an orthogonalization property according to:

$$F_{D/U}(x,t) \neq F_{D/U}(y,t)$$

$$GroupID\ x,y \in \{1,2,3,4,5,6,7\}$$

for all time t, whenever x≠y represent different group-ids. In this case, base stations and/or UEs with different group-ids may perform CCAs during non-overlapping LBT time intervals. In the absence of interference, the base station or UE with the group-id which maps to an earlier LBT time slot may secure the channel for a period of time. According to various deployments, the mapping-function is fair, in the sense that across different time indices t, the mapping $\{F_{D/U}(x, t), t=1, 2, 3, \ldots\}$ varies such that different group-ids have an equal chance of mapping to an earlier LBT time slot (and hence secure the channel in the absence of other interference) over a suitably long interval of time.

All base stations and UEs deployed by the same network operator/service-provider may be assigned the same group-id, so that they do not preempt each other in the contention process. This allows full frequency reuse among base stations and UEs of the same deployment, which may lead to enhanced system throughput. Base stations and/or UEs of different deployments may be assigned different group-ids, so that with orthogonal CCA slot mapping, access to the channel is mutually exclusive.

In examples with non-orthogonal, or overlapping, CCA slot access, the mapping function may allow more than seven group ids. In some situations, for example, it may be useful to support more than seven deployment group-ids, in which case it is not possible to maintain the orthogonality property of CCA slot mapping functions. In such cases, it may be desirable to reduce the frequency of collision between any two group-ids. In some examples, non-orthogonal CCA slot mapping sequences may also be used to provide fair channel access among deployments without tight coordination on LBT opportunities. One example of a non-orthogonal CCA slot mapping sequence is given by:

$$F_{D/U}(x,t) = R_{1,7}(x,t)$$

$$GroupID\ x = \epsilon\{1,2,\ldots 2^{16}\}$$

where $R_{1,7}(x,t)$ is a pseudo-random number generator between 1 and 7 chosen independently for GroupID x. In this case, there could be potential collisions between base stations and/or UEs of different GroupID's in the same LBT frame t.

Thus, LBT time slots may be selected according to the noted mapping functions and used for D-LBT 540 and/or U-LBT 565.

Some modes of communication with a UE may require communication over a plurality of channels (i.e., component carriers), with each channel being established between the UE and one of a number of cells using different component carriers (e.g., serving cells, which in some cases may be different base stations). In some examples, two or more cells may use different carrier frequencies or component carriers, as might be found in a carrier aggregation and/or dual-connectivity (e.g., multiflow) mode of communication. In other examples, two or more cells may be of a same carrier frequency (e.g., component carrier), as might be found in a coordinated multipoint (CoMP) mode of communication. Regardless, each component carrier may be used over a licensed based radio frequency spectrum band and/or an unlicensed radio frequency spectrum band, and a set of component carriers involved in a particular mode of communication may all be received over the licensed radio frequency spectrum band, all be received over an unlicensed radio frequency spectrum band, or be received over a combination of the licensed radio frequency spectrum band and the unlicensed radio frequency spectrum band. To establish communication using a component carrier over the unlicensed radio frequency spectrum band, a CCA may be performed to contend for access to the unlicensed radio frequency spectrum band. When the CCA is successful, the component carrier may be used for communication in the unlicensed radio frequency spectrum band. When the LBT procedure fails, the component carrier may not be used.

Figure 5:
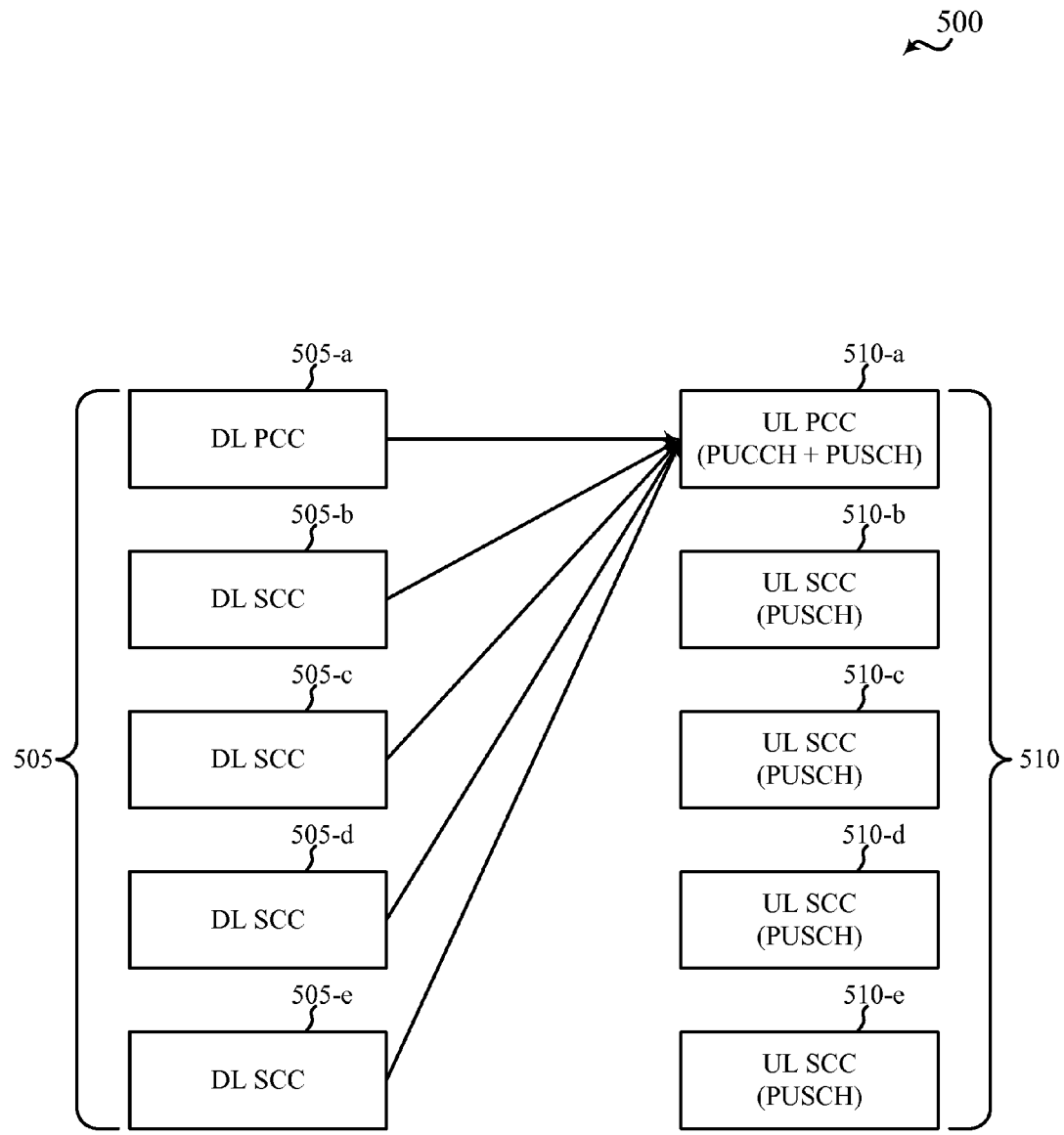
FIG. 5 shows example sets of downlink component carriers and uplink component carriers, in accordance with various aspects of the present disclosure.

FIG. 5 shows example sets 500 of downlink component carriers 505 and uplink component carriers 510, in accordance with various aspects of the present disclosure. More particularly, and by way of example, FIG. 5 shows five downlink (DL) component carriers (CCs) 505 and five uplink (UL) CCs 510. The DL CCs 505 include a DL primary component carrier (DL PCC) 505-a, a first DL secondary component carrier (DL SCC) 505-b, a second DL SCC 505-c, a third DL SCC 505-d, and a fourth DL SCC 505-e. Similarly, the UL CCs 510 include a UL PCC 510-a, a first UL SCC 510-b, a second UL SCC 510-c, a third UL SCC 510-d, and a fourth UL SCC 510-e. The UL PCC 510-a may, for a network such as an LTE/LTE-A network, carry a PUCCH; and each of the UL PCC 510-a, the first UL SCC 510-b, the second UL SCC 510-c, the third UL SCC 510-d, and the fourth UL SCC 510-e may carry a PUSCH. Uplink control information such as acknowledgements and non-acknowledgements (ACKs/NAKs), channel state information (CSI), and/or scheduling request (SR) control information may, in some examples, be transmitted on the PUCCH.

In some examples, each of the DL PCC 505-a, the first DL SCC 505-b, the second DL SCC 505-c, the third DL SCC 505-d, and the fourth DL SCC 505-e may be mapped to the UL PCC 510-a for purposes of reporting uplink control information for a first cell corresponding to the DL PCC 505-a, a second cell corresponding to the first DL SCC 505-b, a third cell corresponding to the second DL SCC 505-c, a fourth cell corresponding to the third DL SCC 505-d, and a fifth cell corresponding the fourth DL SCC 505-e. To reduce the overhead of the PUCCH carried on the UL PCC 510-a, the PUCCH may be configured such that a resource (e.g., a shared resource, such as one or more OFDM symbols) in an uplink subframe of the UL PCC 510-a is used to report uplink control information for each of the first cell, the second cell, the third cell, the fourth cell, and the fifth cell. A conflict for the resource in the uplink subframe may therefore exist. To resolve the conflict, reporting of the uplink control information for each of the first cell, the second cell, the third cell, the fourth cell, and the fifth cell may be prioritized such that uplink control information for one of the first cell, the second cell, the third cell, the fourth cell, and the fifth cell is transmitted during a particular instance of the resource.

Periodic uplink control information reporting and/or aperiodic uplink control information reporting may be supported in a system in which data and control information is transmitted from a plurality of cells (e.g., using different component carriers) to a UE over a set of DL CCs such as the DL CCs 505, and transmitted from the UE to one or more of the base stations corresponding to the plurality of cells over a set of UL CCs such as the UL CCs 510. In an example of periodic uplink control information reporting in a carrier aggregation mode, the reporting of uplink control information may be prioritized based on priority levels of reporting types of CSI.

In some examples, the priority levels of the reporting types of CSI may include: a top priority level when a reporting type of CSI includes at least one of a rank indicator (RI), a precoding type indicator (PTI), or a wideband precoding matrix indicator (PMI) (e.g., a reporting type of 3, 5, 6, or 2a); a medium priority level when a reporting type of CSI includes at least one of a wideband channel quality indication (CQI), or a wideband CQI with PMI (e.g., a reporting type of 2, 2b, 2c, or 4); and/or a low priority level when a reporting type of CSI includes at least one of a subband CQI, or a subband CQI with PMI (e.g., a reporting type of 1, 1a). When a priority level of the reporting type of CSI is the same for two or more cells, priority for reporting uplink control information may be determined based on a comparison of serving cell indices of the conflicting cells. For example, a cell with a lower cell index may be given a priority over a cell with a higher cell index. The serving cell indices for a plurality of cells may be configured on a UE-by-UE basis. The same priority rules may be applied regardless of whether PUSCH is transmitted.

After prioritizing the reporting of uplink control information for a plurality of cells, the uplink control information for the cell associated with the highest priority may be reported using the resource for which a conflict exists, and the uplink control information for the remaining cells may be discarded.

In an example of aperiodic uplink control information reporting in a carrier aggregation mode, the reporting of uplink control information may be prioritized based on the state of a two bit CSI request field, in which a "00" state may indicate that no CSI should be reported; a "01" state may indicate that uplink control information for the cell/DL CC 505 that is system information block 2 (SIB2)-linked to the UL PCC 510-a; and "10" and "11" states may indicate that the prioritization of the reporting of uplink control information for a plurality of cells is configured by radio resource control (RRC). For the common search space, a "0" state may indicate that no CSI should be reported; and a "1" state may indicate that the prioritization of the reporting of uplink control information for a plurality of cells is configured by RRC. The RRC may prioritize reporting for any combination of up to five component carriers.

In an example of aperiodic uplink control information reporting in a CoMP mode, for which two or more CSI processes may be defined, with each CSI process associated with a particular transmission point involved in CoMP, the reporting of uplink control information may be prioritized based on the state of a two bit CSI request field, in which a "00" state may indicate that no CSI should be reported; a "01" state may indicate that the prioritization of the reporting of uplink control information for a plurality of cells is configured by RRC, with the RRC-configured CSI process limited to a given cell; and "10" and "11" states may indicate that the prioritization of the reporting of uplink control information for a plurality of cells is configured by RRC. For the common search space, a "0" state may indicate that no CSI should be reported; and a "1" state may indicate that the prioritization of the reporting of uplink control information for a plurality of cells is configured by RRC. The RRC may prioritize reporting for any combination of up to five component carriers.

Consider now a set of DL CCs such as the DL CCs 505 shown in FIG. 5. In one example, a first DL CC, such as the DL PCC 505-a, is transmitted over a licensed radio frequency spectrum band (e.g., a radio frequency spectrum band for which apparatuses do not contend for access because the spectrum band is licensed to particular users for particular uses). A second DL CC, such as the DL SCC 505-b, may be transmitted over an unlicensed radio frequency spectrum band (e.g., a radio frequency spectrum band for which apparatuses may need to contend for access because the radio frequency spectrum band is available for unlicensed use, such as a Wi-Fi radio frequency spectrum band). Because a DL PCC is (in some examples) assigned a serving cell index of "0" (i.e., the lowest serving cell index), any time there is a conflict for resources based on priority level of reporting type of CSI, the cell associated with the DL PCC 505-a will be given priority. This, combined with the fact that use of an unlicensed radio frequency spectrum band is dependent on contending for access to the unlicensed radio frequency spectrum band via a successful LBT procedure (and therefore opportunistic), means that the reporting of uplink control information for the cell associated with the DL SCC 505-b may be infrequent or, in some cases, effectively blocked. However, because of the dynamic nature of contending for access to an unlicensed radio frequency spectrum band, uplink control information for a cell that uses a CC over an unlicensed radio frequency spectrum band may be more valuable—especially when there is a long succession of failed clear channel assessments. Thus, in some examples, it may be useful to prioritize the reporting of uplink control information, for a shared resource of an uplink subframe, based at least in part on whether a cell utilizes an unlicensed radio frequency spectrum band.

When a clear channel assessment performed by a base station fails to win contention to access a component carrier in an unlicensed radio frequency spectrum band, the one or more signals transmitted to estimate channel state information for the component carrier in the unlicensed radio frequency spectrum band may not exist (e.g., a valid measurement subframe may not exist). In the case of periodic CSI reporting, a UE may estimate and/or report channel state information based on measurements taken for a last valid subframe (e.g., measurements for the last subframe for which a clear channel assessment performed by the base station was successful). However, in the case of aperiodic CSI reporting, the event-driven nature of the aperiodic CSI reporting may require the buffering of measurements (or a measurement subframe) for estimating channel state information. Because aperiodic CSI reporting is event-driven, the measurements taken for a last valid subframe may need to be buffered for an indefinite duration (e.g., until a base station wins contention to access a component carrier of an unlicensed radio frequency spectrum band).

When a clear channel assessment performed by a base station succeeds, but a UE incorrectly determines that it has failed, the UE may assume that the one or more signals transmitted to estimate channel state information for the component carrier in the unlicensed radio frequency spectrum band do not exist (e.g., a valid measurement subframe does not exist).

In one example, there may be ambiguity at a base station regarding whether and/or when CSI is reported, as well as ambiguity regarding the component carrier(s) for which the CSI is reported (i.e., there may be misalignment of the base station with respect to the CSI reporting of the UE). This ambiguity may be due to a failure of a clear channel assessment performed by a base station. This ambiguity may also be caused by a UE incorrectly determining that a clear channel assessment performed by a base station has succeeded or failed (when, in fact, the clear channel assessment has not succeeded or has not failed). Further, this ambiguity may be the result of a UE reporting different types of CSI (or no CSI) based on whether a clear channel assessment performed by a base station is determined to have succeeded or failed. Various misalignment issues of an eNB with respect to aperiodic CSI reporting of a UE and periodic CSI reporting of a UE are described below.

As a first example of a misalignment issue of a base station with respect to aperiodic channel state information reporting, consider a UE that incorrectly determines that a clear channel assessment failed to access a component carrier in an unlicensed radio frequency spectrum band for a downlink frame. Because the UE determines that the clear channel assessment failed, the UE may omit reporting aperiodic channel state information associated with the component carrier in the unlicensed radio frequency spectrum band. However, because the clear channel assessment performed by the base station was successful, the base station may expect a report of aperiodic channel state information (assuming the base station dynamically requested a report of aperiodic channel state information). This represents a misalignment issue. As a second example of a misalignment issue, consider aperiodic channel state information that is reported along with an uplink shared channel (UL-SCH) on a PUSCH. Because the aperiodic channel state information may be multiplexed with the UL-SCH by splitting available PUSCH resources, a base station may not be able to discern which PUSCH resources are allocated to the aperiodic channel state information and which resources are allocated to the UL-SCH. This represents a misalignment issue. In some cases, the base station may attempt to blindly detect the allocation of resources for the aperiodic channel state information and the UL-SCH. The blind detection may or may not be successful. As a third example of a misalignment issue, consider a transmission of only aperiodic channel state information in the presence of multiple component carriers (e.g., a primary component carrier and one or more secondary component carriers). A base station may be unable to determine the number or identity(ies) of component carriers to which the aperiodic channel state information applies. This represents a misalignment issue.

As a first example of a misalignment issue of a base station with respect to periodic channel state information reporting, consider a UE that incorrectly determines that a clear channel assessment failed for a downlink frame for a component carrier in an unlicensed radio frequency spectrum band. Because the UE determines that the clear channel assessment failed, the UE may omit reporting periodic channel state information or report periodic channel state information for a component carrier in a licensed radio frequency spectrum band. However, because the clear channel assessment performed by the base station was successful, the base station may expect a report of periodic channel state information for a component carrier in an unlicensed radio frequency spectrum band. Although a base station that receives periodic channel state information from the UE may attempt to blindly detect whether the periodic channel state information corresponds to a component carrier in an unlicensed radio frequency spectrum band or a component carrier in a licensed radio frequency spectrum band, the blind detection may not be successful (e.g., especially when the bitwidth of the periodic channel state information for the unlicensed radio frequency spectrum band and the bitwidth of the periodic channel state information for the licensed radio frequency spectrum band are the same). This represents a misalignment issue.

Figure 6:
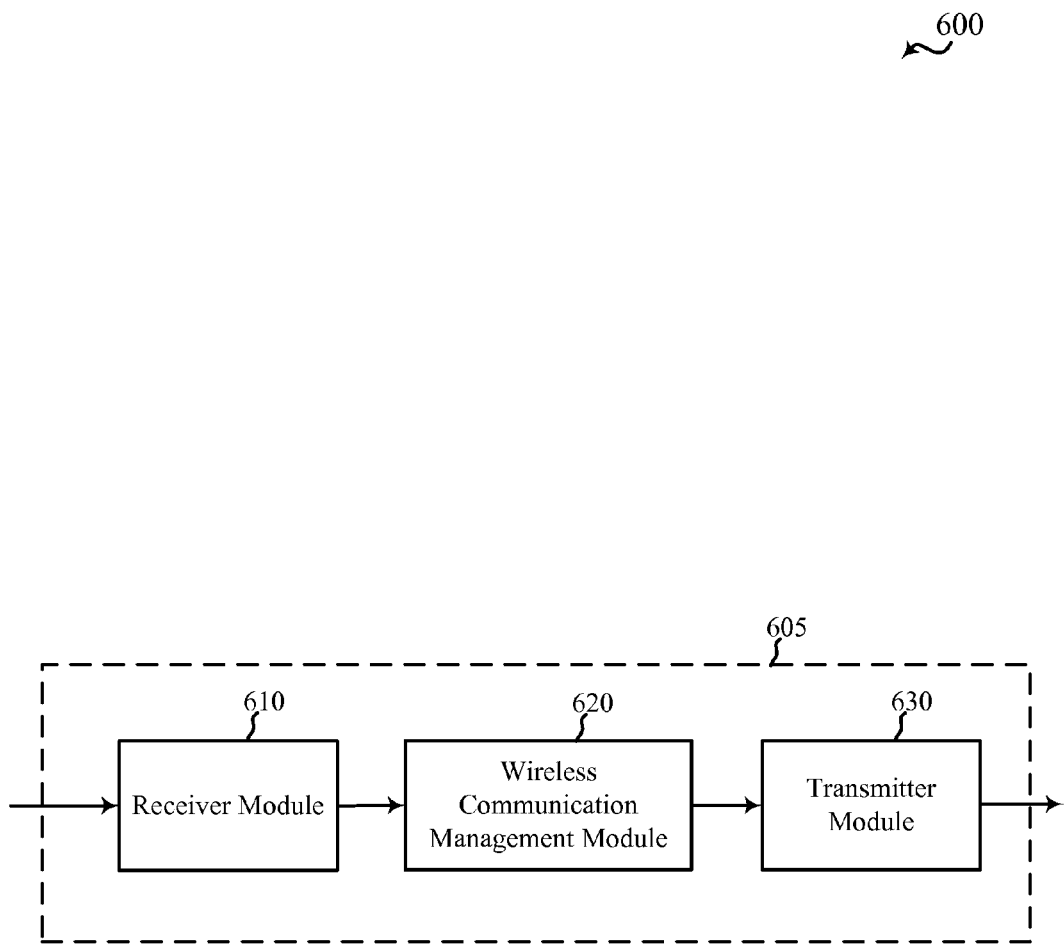
FIG. 6 shows a block diagram of an apparatus for use in wireless communication, in accordance with various aspects of the present disclosure.

FIG. 6 shows a block diagram 600 of an apparatus 605 for use in wireless communication, in accordance with various aspects of the present disclosure. In some examples, the apparatus 605 may be an example of aspects of one or more of the UEs 115 and/or 215 described with reference to FIGS. 1 and/or 2. The apparatus 605 may also be a processor. The apparatus 605 may include a receiver module 610, a wireless communication management module 620, and/or a transmitter module 630. Each of these components may be in communication with each other.

The components of the apparatus 605 may, individually or collectively, be implemented using one or more application-specific integrated circuits (ASICs) adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, Field Programmable Gate Arrays (FPGAs), and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 610 may include at least one radio frequency (RF) receiver, such as at least one RF receiver operable to receive transmissions over a licensed radio frequency spectrum band (e.g., a radio frequency spectrum band for which apparatuses do not contend for access because the radio frequency spectrum band is licensed to particular users for particular uses) and/or an unlicensed radio frequency spectrum band (e.g., a radio frequency spectrum band for which apparatuses may need to contend for access because the radio frequency spectrum band is available for unlicensed use, such as a Wi-Fi radio frequency spectrum band and/or another unlicensed radio frequency spectrum band). In some examples, both the licensed radio frequency spectrum band and the unlicensed radio frequency spectrum band may be used for LTE/LTE-A communications, as described, for example, with reference to FIGS. 1 and/or 2. The receiver module 610 may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the transmitter module 630 may include at least one RF transmitter, such as at least one RF transmitter operable to transmit over the licensed radio frequency spectrum band and/or the unlicensed radio frequency spectrum band. The transmitter module 630 may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the wireless communication management module 620 may be configured to receive a service via one or more component carriers, with at least one of the component carriers being in an unlicensed radio frequency spectrum band. The wireless communication management module 620 may also be configured to measure one or more signals associated with at least one of the component carriers to estimate channel state information of at least one component carrier in the unlicensed radio frequency spectrum band. The channel state information may then be transmitted (e.g., to a base station) in a manner that enables the channel state information to be understood (e.g., in a manner in which ambiguity in the nature of the channel state information may be lessened or eliminated). Techniques for lessening or removing ambiguity from channel state information may include, for example, transmitting the channel state information even when a clear channel assessment is determined to have failed for a downlink frame for a component carrier; enabling a base station to explicitly configure what channel state information is to be transmitted when; or transmitting the channel state information with an indication used to identify the component carrier associated with the channel state information. These and other techniques are described in greater detail with reference to FIGS. 7, 8, and 10-18.

Figure 7:
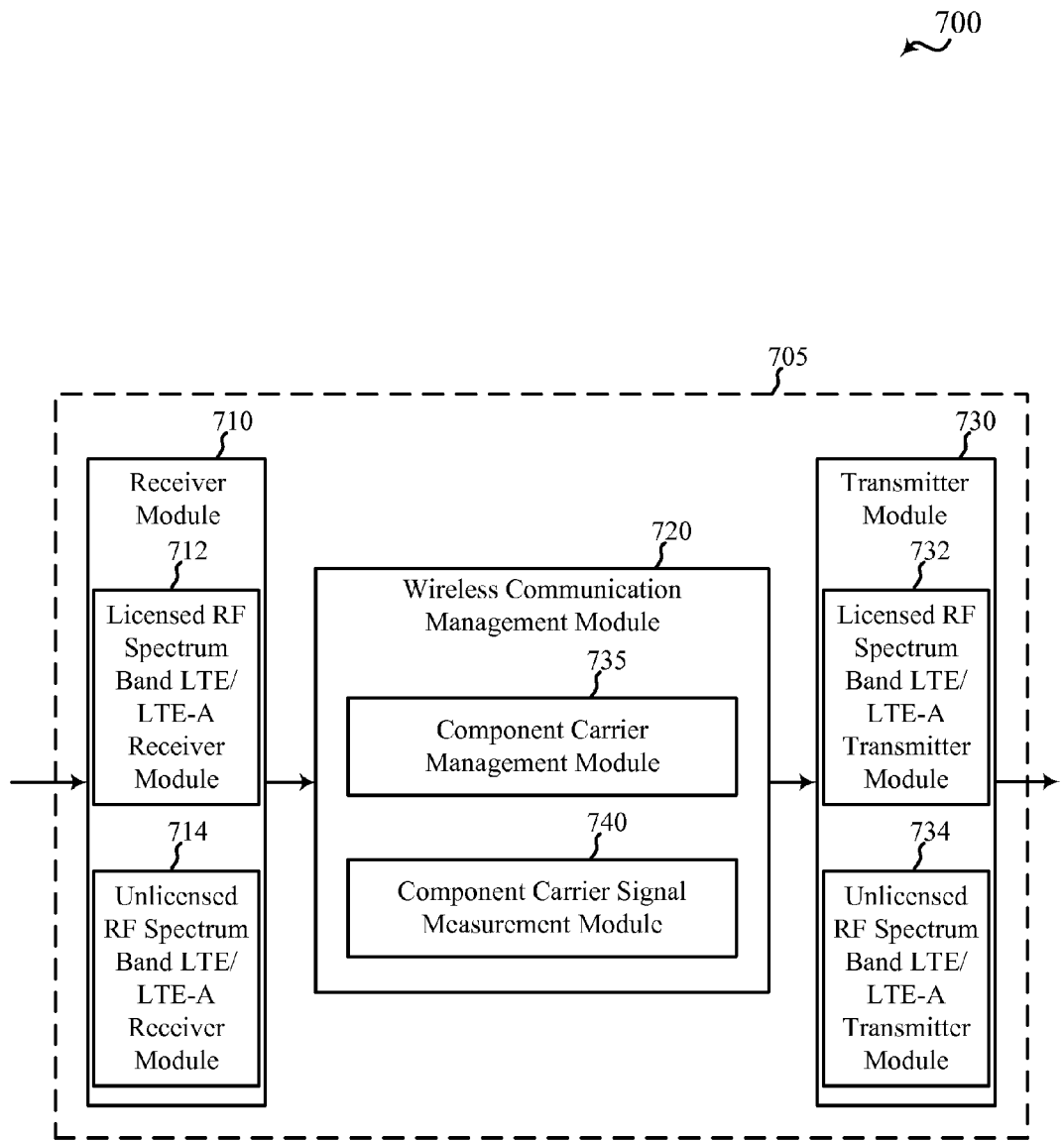
FIG. 7 shows a block diagram of an apparatus for use in wireless communication, in accordance with various aspects of the present disclosure.

FIG. 7 shows a block diagram 700 of an apparatus 705 for use in wireless communication, in accordance with various aspects of the present disclosure. In some examples, the apparatus 705 may be an example of aspects of one or more of the UEs 115 and/or 215 described with reference to FIGS. 1 and/or 2, and/or an example of aspects of the apparatus 605 described with reference to FIG. 6. The apparatus 705 may also be a processor. The apparatus 705 may include a receiver module 710, a wireless communication management module 720, and/or a transmitter module 730. Each of these components may be in communication with each other.

The components of the apparatus 705 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 710 may include at least one RF receiver, such as at least one RF receiver operable to receive transmissions over licensed radio frequency spectrum band (e.g., a radio frequency spectrum band for which apparatuses do not contend for access because the radio frequency spectrum band is licensed to particular users for particular uses) and/or an unlicensed radio frequency spectrum band (e.g., a radio frequency spectrum band for which apparatuses may need to contend for access because the radio frequency spectrum band is available for unlicensed use, such as a Wi-Fi radio frequency spectrum band). In some examples, both the licensed radio frequency spectrum band and the unlicensed radio frequency spectrum band may be used for LTE/LTE-A communications, as described, for example, with reference to FIGS. 1 and/or 2. The receiver module 710 may in some cases include separate receivers for the licensed radio frequency spectrum band and the unlicensed radio frequency spectrum band. The separate receivers may, in some examples, take the form of a licensed RF spectrum band LTE/LTE-A receiver module 712 for communicating over the licensed radio frequency spectrum band, and an unlicensed RF spectrum band LTE/LTE-A receiver module 714 for communicating over the unlicensed radio frequency spectrum band. The receiver module 710, including the licensed RF spectrum band LTE/LTE-A receiver module 712 and/or the unlicensed RF spectrum band LTE/LTE-A receiver module 714, may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the transmitter module 730 may include at least one RF transmitter, such as at least one RF transmitter operable to transmit over the licensed radio frequency spectrum band and/or the unlicensed radio frequency spectrum band. The transmitter module 730 may in some cases include separate transmitters for the licensed radio frequency spectrum band and the unlicensed radio frequency spectrum band. The separate transmitters may, in some examples, take the form of a licensed RF spectrum band LTE/LTE-A transmitter module 732 for communicating over the licensed radio frequency spectrum band, and an unlicensed RF spectrum band LTE/LTE-A transmitter module 734 for communicating over the unlicensed radio frequency spectrum band. The transmitter module 730, including the licensed RF spectrum band LTE/LTE-A transmitter module 732 and/or the unlicensed RF spectrum band LTE/LTE-A transmitter module 734, may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the wireless communication management module 720 may be an example of one or more aspects of the wireless communication management module 620 described with reference to FIG. 6. The wireless communication management module 720 may include a component carrier management module 735, and/or a component carrier signal measurement module 740. Each of these components may be in communication with each other.

In some examples, the component carrier management module 735 may be used to receive (e.g., from a base station) a service via a component carrier. The component carrier may be in an unlicensed radio frequency spectrum band. In some examples, the service (or one or more other services) may be received via one or more additional component carriers in the unlicensed radio frequency spectrum band and/or one or more component carriers in a licensed radio frequency spectrum band.

In some examples, the component carrier signal measurement module 740 may be used to measure one or more signals transmitted on the component carrier to estimate channel state information of the component carrier in the unlicensed radio frequency spectrum band.

Figure 8:
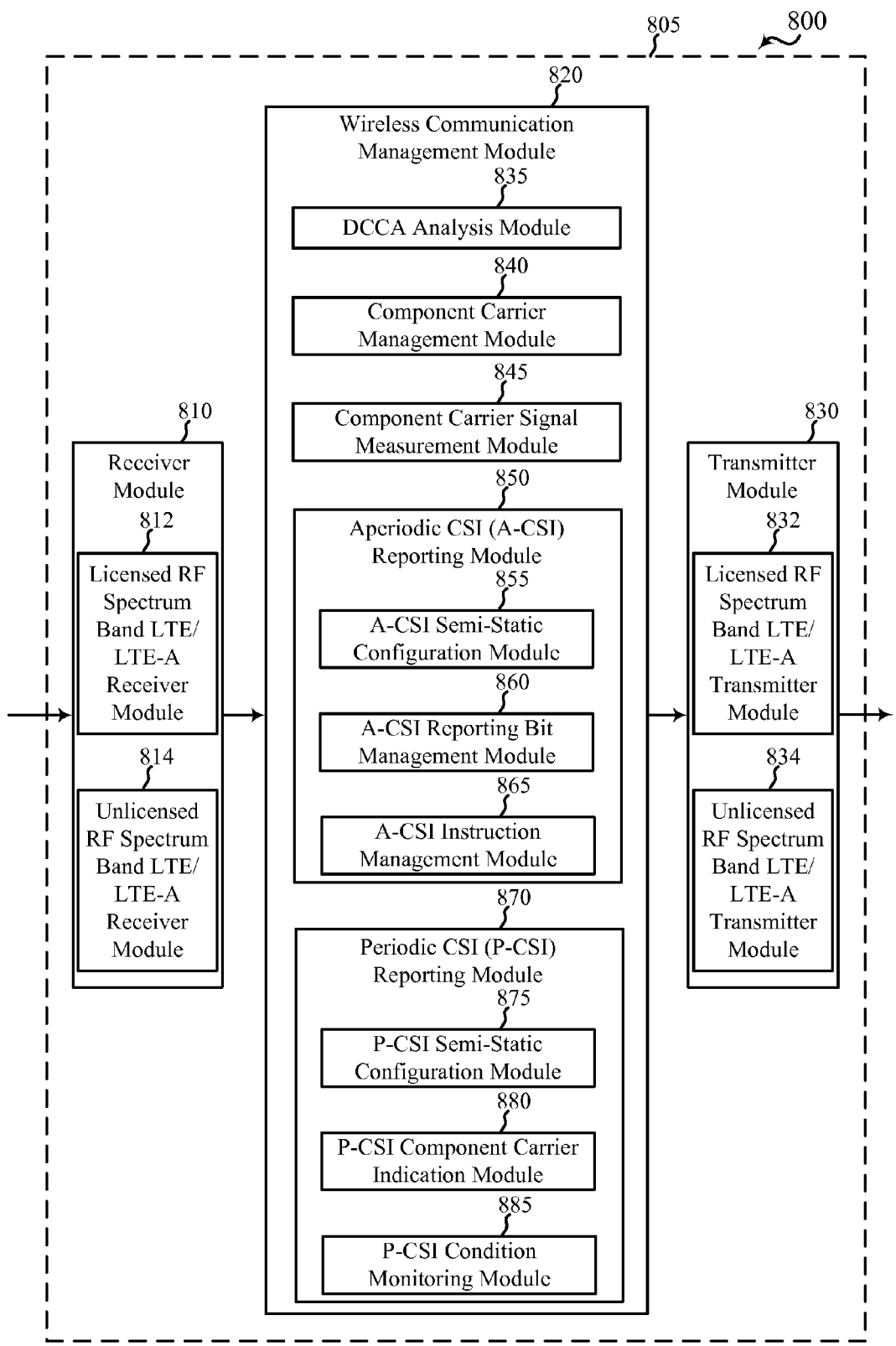
FIG. 8 shows a block diagram of an apparatus for use in wireless communication, in accordance with various aspects of the present disclosure.

FIG. 8 shows a block diagram 800 of an apparatus 805 for use in wireless communication, in accordance with various aspects of the present disclosure. In some examples, the apparatus 805 may be an example of aspects of one or more of the UEs 115 and/or 215 described with reference to FIGS. 1 and/or 2, and/or an example of aspects of the apparatuses 605 and/or 705 described with reference to FIGS. 6 and/or 7. The apparatus 805 may also be a processor. The apparatus 805 may include a receiver module 810, a wireless communication management module 820, and/or a transmitter module 830. Each of these components may be in communication with each other.

The components of the apparatus 805 may, individually or collectively, be implemented using one or more ASICs adapted to perform some or all of the applicable functions in hardware. Alternatively, the functions may be performed by one or more other processing units (or cores), on one or more integrated circuits. In other examples, other types of integrated circuits may be used (e.g., Structured/Platform ASICs, FPGAs, and other Semi-Custom ICs), which may be programmed in any manner known in the art. The functions of each unit may also be implemented, in whole or in part, with instructions embodied in a memory, formatted to be executed by one or more general or application-specific processors.

In some examples, the receiver module 810 may include at least one RF receiver, such as at least one RF receiver operable to receive transmissions over licensed radio frequency spectrum band (e.g., a radio frequency spectrum band for which apparatuses do not contend for access because the radio frequency spectrum band is licensed to particular users for particular uses) and/or an unlicensed radio frequency spectrum band (e.g., a radio frequency spectrum band for which apparatuses may need to contend for access because the radio frequency spectrum band is available for unlicensed use, such as a Wi-Fi radio frequency spectrum band). In some examples, both the licensed radio frequency spectrum band and the unlicensed radio frequency spectrum band may be used for LTE/LTE-A communications, as described, for example, with reference to FIGS. 1 and/or 2. The receiver module 810 may in some cases include separate receivers for the licensed radio frequency spectrum band and the unlicensed radio frequency spectrum band. The separate receivers may, in some examples, take the form of a licensed RF spectrum band LTE/LTE-A receiver module 812 for communicating over the licensed radio frequency spectrum band, and an unlicensed RF spectrum band LTE/LTE-A receiver module 814 for communicating over the unlicensed radio frequency spectrum band. The receiver module 810, including the licensed RF spectrum band LTE/LTE-A receiver module 812 and/or the unlicensed RF spectrum band LTE/LTE-A receiver module 814, may be used to receive various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the transmitter module 830 may include at least one RF transmitter, such as at least one RF transmitter operable to transmit over the licensed radio frequency spectrum band and/or the unlicensed radio frequency spectrum band. The transmitter module 830 may in some cases include separate transmitters for the licensed radio frequency spectrum band and the unlicensed radio frequency spectrum band. The separate transmitters may, in some examples, take the form of a licensed RF spectrum band LTE/LTE-A transmitter module 832 for communicating over the licensed radio frequency spectrum band, and an unlicensed RF spectrum band LTE/LTE-A transmitter module 834 for communicating over the unlicensed radio frequency spectrum band. The transmitter module 830, including the licensed RF spectrum band LTE/LTE-A transmitter module 832 and/or the unlicensed RF spectrum band LTE/LTE-A transmitter module 834, may be used to transmit various types of data and/or control signals (i.e., transmissions) over one or more communication links of a wireless communication system, such as one or more communication links of the wireless communication system 100 and/or 200 described with reference to FIGS. 1 and/or 2. The communication links may be established over the licensed radio frequency spectrum band and/or the unlicensed radio frequency spectrum band.

In some examples, the wireless communication management module 820 may be an example of one or more aspects of the wireless communication management module 620 and/or 720 described with reference to FIGS. 6 and/or 7. The wireless communication management module 820 may include a DCCA analysis module 835, a component carrier management module 840, a component carrier signal measurement module 845, an aperiodic CSI (A-CSI) reporting module 850, and/or a periodic CSI (P-CSI) reporting module 870. Each of these components may be in communication with each other.

In some examples, the DCCA analysis module 835 may be used to determine whether a clear channel assessment failed for a downlink frame for a component carrier in an unlicensed radio frequency spectrum band. In some examples, the DCCA analysis module 835 may determine whether the clear channel assessment failed based at least in part on a channel usage beacon signal, a reference signal for a channel state information report, and/or other information received for a downlink frame (any or all of which may be received from a base station over the component carrier in the unlicensed radio frequency spectrum band).

In some examples, the component carrier management module 840 may be used to receive (e.g., from a base station) a service via a component carrier. The component carrier may be in an unlicensed radio frequency spectrum band. In some examples, the service (or one or more other services) may also be received via one or more additional component carriers in the unlicensed radio frequency spectrum band and/or one or more component carriers in a licensed radio frequency spectrum band.

In some examples, the component carrier signal measurement module 845 may be used to measure one or more signals transmitted on the at least one component carrier to estimate channel state information of the component carrier in the unlicensed radio frequency spectrum band. Alternately, or additionally, the component carrier signal measurement module 845 may be used to measure one or more signals transmitted on at least one component carrier in a licensed radio frequency spectrum band.

In some examples, the A-CSI reporting module 850 may be used to aperiodically transmit channel state information (e.g., to a base station). For example, in a first mode of operation of the apparatus 805, the component carrier management module 840 may be used to receive (e.g., from a base station) a service via a component carrier. The component carrier may be in an unlicensed radio frequency spectrum band. The DCCA analysis module 835 may be used to determine whether a clear channel assessment failed for a downlink frame for the component carrier. Upon determining that the clear channel assessment succeeded for the downlink frame for the component carrier, the component carrier signal measurement module 845 may be used to measure one or more signals transmitted on the component carrier to estimate channel state information of the component carrier in the unlicensed radio frequency spectrum band. The A-CSI reporting module 850 may then be used to aperiodically transmit or not transmit the channel state information according to default reporting rules, as described, for example, with reference to FIG. 5. Upon determining that the clear channel assessment failed to access a component carrier in the unlicensed radio frequency spectrum band for the downlink frame, the component carrier signal measurement module 845 may be used to 1) retrieve measurements for one or more historic signals transmitted on the component carrier to estimate channel state information of the component carrier in the unlicensed radio frequency spectrum band (e.g., retrieve measurements based on a measuring of one or more historic signals associated with the component carrier to estimate channel state information), or 2) measure one or more current signals transmitted on the component carrier to estimate channel state information of the component carrier in the unlicensed radio frequency spectrum band. The one or more signals may be measured during the downlink frame for the component carrier. The A-CSI reporting module 850 and/or A-CSI semi-static configuration module 855 may then be used to aperiodically transmit the channel state information of the component carrier.

The first mode of operation of the apparatus 805 may be useful, in one respect, because the aperiodic transmission of channel state information is not dependent on a UE correctly determining whether a clear channel assessment failed. This may provide better alignment between a base station and a UE that are in communication over a component carrier, but at the expense of higher overhead—especially when a serving cell or cells for a component carrier in an unlicensed radio frequency spectrum band has/have a high probability of failed clear channel assessments. In some examples, a base station receiving the channel state information transmitted by the apparatus 805 may discard channel state information that is not useful (e.g., because it corresponds to a clear channel assessment that actually failed).

In a second mode of operation of the apparatus 805, the component carrier management module 840 may be used to receive (e.g., from a base station) a service via a component carrier. The component carrier may be in an unlicensed radio frequency spectrum band. The DCCA analysis module 835 may be used to determine whether a clear channel assessment failed for a downlink frame for the component carrier. Upon determining that the clear channel assessment succeeded for the downlink frame for the component carrier, the component carrier signal measurement module 845 may be used to measure one or more signals associated with the component carrier in the unlicensed radio frequency spectrum band to estimate channel state information. The A-CSI reporting module 850 and/or A-CSI semi-static configuration module 855 may then be used to aperiodically transmit or not transmit the channel state information according to default reporting rules, as described, for example, with reference to FIG. 5. Upon determining that the clear channel assessment failed to access a component carrier in the unlicensed radio frequency spectrum band for the downlink frame, the component carrier signal measurement module 845 may be used to 1) retrieve measurements for one or more historic signals transmitted on the component carrier to estimate channel state information of the component carrier in the unlicensed radio frequency spectrum band (e.g., retrieve measurements based on a measuring of one or more historic signals associated with the component carrier to estimate channel state information), or 2) measure one or more current signals transmitted on the at least one component carrier to estimate channel state information of the component carrier in the unlicensed radio frequency spectrum band. The one or more signals may be measured during the downlink frame for the component carrier. The A-CSI reporting module 850 may then be used to omit an aperiodic transmission of the channel state information for one or more subframes of the downlink frame for the component carrier.

In a third mode of operation of the apparatus 805, the component carrier management module 840 may be used to receive (e.g., from a base station) a service via a component carrier. The component carrier may be in an unlicensed radio frequency spectrum band. The apparatus 805 may receive instructions or indications from a base station to determine whether to report channel state information associated with the component carrier in the unlicensed radio frequency spectrum band. For example, the instructions or indications may be provided via a channel state information bit associated with the component carrier in the unlicensed radio frequency spectrum band. The A-CSI reporting bit management module 860 may be used to receive an aperiodic channel state information bit associated with the component carrier in the unlicensed radio frequency spectrum band. The aperiodic channel state information bit may indicate whether to aperiodically transmit the channel state information of the component carrier. The aperiodic channel state information bit may be provided, for example, in a downlink and/or control transmission of an eNB. In some examples, an aperiodic channel state information bit may be provided for each of a number of component carriers in the unlicensed radio frequency spectrum band. The DCCA analysis module 835 may be used to determine whether a clear channel assessment failed for a downlink frame for the component carrier. The component carrier signal measurement module 845 may be used to measure one or more signals transmitted on the at least one component carrier to estimate channel state information of the component carrier in the unlicensed radio frequency spectrum band. The A-CSI reporting module 850 may then be used to aperiodically transmit or not transmit the channel state information according to a state of the aperiodic channel state information bit associated with the component carrier in the unlicensed radio frequency spectrum band. For example, the A-CSI reporting module 850 and/or A-CSI reporting bit management module 860 may be used to transmit the channel state information when the state of the aperiodic channel state information bit is a logic high (e.g., a binary "1"), and not transmit the channel state information when the state of the aperiodic channel state information is a logic low (e.g., a binary "0").

The third mode of operation of the apparatus 805 may be useful, in one respect, because the aperiodic transmission of channel state information is not dependent on a UE correctly determining whether a clear channel assessment failed, but is instead based on an explicit indication (e.g., from a base station) of whether channel state information should be transmitted. This may provide better alignment between a base station and a UE that are in communication over a component carrier.

In a fourth mode of operation of the apparatus 805, the component carrier management module 840 may be used to receive (e.g., from a base station) a service via a component carrier. The component carrier may be in an unlicensed radio frequency spectrum band. The A-CSI instruction management module 865 may be used to receive instructions as to which mode of operation to use when reporting channel state information associated with a component carrier. The instructions may be provided, for example, in a downlink and/or control transmission of a base station. In some examples, the instructions may indicate that (or when) channel state information is to be transmitted regardless of whether a clear channel assessment is determined to have failed for a downlink frame for the component carrier, or that (or when) an aperiodic transmission of channel state information is to be omitted when a clear channel assessment is determined to have failed for the component carrier, or that an aperiodic transmission of channel state information is to be made or not made based on an instruction or indication (e.g., a channel state information bit) provided by a base station. In some examples, the component carrier may be a first component carrier and the A-CSI instruction management module 865 may be used to receive the instructions over a second component carrier. The DCCA analysis module 835 may be used to determine whether a clear channel assessment failed for a downlink frame for the component carrier. The component carrier signal measurement module 845 may be used to measure one or more signals transmitted on the component carrier to estimate channel state information in the unlicensed radio frequency spectrum band. The A-CSI reporting module 850 may then be used to aperiodically transmit or not transmit the channel state information according to the instructions received by the A-CSI instruction management module 865.

The fourth mode of operation of the apparatus 805 may be useful, in one respect, because the aperiodic transmission of channel state information is configurable. For example, the method for aperiodically transmitting or not transmitting channel state information may be determined by a base station that does or does not want to receive the channel state information when a UE determines that a clear channel assessment failed for a downlink frame for a component carrier in an unlicensed radio frequency spectrum band.

In some examples, the P-CSI reporting module 870 may be used to periodically transmit channel state information (e.g., to a base station). For example, in a fifth mode of operation of the apparatus 805, the component carrier management module 840 may be used to receive (e.g., from a base station) a service via a component carrier. The component carrier may be in an unlicensed radio frequency spectrum band. The DCCA analysis module 835 may be used to determine whether a clear channel assessment failed for a downlink frame for the the component carrier. The component carrier signal measurement module 845 may be used to measure one or more signals transmitted on the component carrier to estimate channel state information of the component carrier in the unlicensed radio frequency spectrum band. In an example, when a clear channel assessment to contend for access to a component carrier in an unlicensed radio frequency spectrum band fails for a downlink frame, the P-CSI reporting module 870 and/or P-CSI semi-static configuration module 875 may be used to periodically report outdated channel state information (e.g., channel state information associated with a prior successful clear channel assessment to gain access to the component carrier in the unlicensed radio frequency spectrum band). The P-CSI reporting module 870 and/or P-CSI semi-static configuration module 875 may then be used to periodically transmit the channel state information regardless of whether a clear channel assessment failed to access a component carrier in an unlicensed radio frequency spectrum band for the downlink frame.

The fifth mode of operation of the apparatus 805 may be useful, in one respect, because the periodic transmission of channel state information is not dependent on a UE correctly determining whether a clear channel assessment failed. This may provide better alignment between a base station and a UE that are in communication over a component carriers.

In a sixth mode of operation of the apparatus 805, the component carrier management module 840 may be used to receive (e.g., from a base station) a service via a component carrier. The DCCA analysis module 835 may be used to determine whether a clear channel assessment failed for a downlink frame for the component carrier. Upon determining that the clear channel assessment succeeded for the downlink frame for the component carrier, the component carrier signal measurement module 845 may measure one or more current signals transmitted on the component carrier to estimate channel state information of the component carrier in the unlicensed radio frequency spectrum band. Upon determining that the clear channel assessment failed for the downlink frame for the component carrier, the component carrier signal measurement module 845 may be used to 1) retrieve measurements for one or more historic signals transmitted on the component carrier to estimate channel state information of the component carrier in the unlicensed radio frequency spectrum band, or 2) measure one or more current signals transmitted on at least one component carrier in a licensed radio frequency spectrum band to estimate channel state information. The P-CSI reporting module 870 and/or P-CSI semi-static configuration module 875 may then be used to periodically transmit or not transmit the channel state information according to default reporting rules, as described, for example, with reference to FIG. 5.

The sixth mode of operation of the apparatus 805 may be useful, in one respect, because the periodic transmission of channel state information is not dependent on a UE correctly determining whether a clear channel assessment failed. However, a base station receiving the channel state information transmitted by the P-CSI reporting module 870 and/or P-CSI semi-static configuration module 875 may need to blindly detect which type of channel state information it receives from a UE. If a base station cannot detect which type of channel state information it receives from a UE, the base station may have to discard the channel state information.

In a seventh mode of operation of the apparatus 805, the component carrier management module 840 may be used to receive (e.g., from a base station) a service via a component carrier. The component carrier may be in an unlicensed radio frequency spectrum band. The DCCA analysis module 835 may be used to determine whether a clear channel assessment failed for a downlink frame for the component carrier. The component carrier signal measurement module 845 may be used to measure one or more signals transmitted on the component carrier to estimate channel state information of the component carrier in the unlicensed radio frequency spectrum band. The P-CSI reporting module 870 and/or P-CSI semi-static configuration module 875 may then be used to periodically transmit the channel state information. In some examples, the channel state information may include an indication used to identify the component carrier associated with the channel state information, regardless of whether the clear channel assessment failed for the downlink frame for the component carrier. In other examples, the channel state information may include the indication used to identify the component carrier associated with the channel state information when the clear channel assessment analyzed by the DCCA analysis module is determined to have failed.

In some examples, the indication used to identify the component carrier associated with the channel state information may explicitly identify the component carrier associated with the channel state information.

In some examples, the indication used to identify the component carrier associated with the channel state information may implicitly identify the component carrier associated with the channel state information. For example, the indication used to identify the component carrier associated with the channel state information may include a scrambling pattern (e.g., a scrambling code) associated with the component carrier associated with the channel state information. In one particular example, the scrambling pattern may include a first scrambling pattern when the channel state information is associated with a primary cell, and the scrambling pattern may include a second scrambling pattern when the channel state information is associated with a secondary cell.

In another example, the indication used to identify the component carrier associated with the channel state information may include a rate matching for a multiplexed PUCCH and PUSCH and/or a PUCCH resource location. For example, a first rate matching may be used when the channel state information is associated with a primary cell, and a second rate matching may be used when the channel state information is associated with a secondary cell.

The seventh mode of operation of the apparatus 805 may be useful, in one respect, because channel state information is periodically transmitted with an indication that removes ambiguity regarding the component carrier to which it pertains.

In an eighth mode of operation of the apparatus 805, the component carrier management module 840 may be used to receive (e.g., from a base station) a service via a component carrier. The component carrier may be in an unlicensed radio frequency spectrum band. The DCCA analysis module 835 may be used to determine whether a clear channel assessment failed for a downlink frame for the component carrier. The component carrier signal measurement module 845 may be used to measure one or more signals transmitted on the component carrier to estimate channel state information of the component carrier in the unlicensed radio frequency spectrum band. The P-CSI condition monitoring module 885 may be used to determine whether a condition is met. In one example, the condition may include a same payload size for at least two alternate channel state information transmissions. A same payload size may exist, for example, when a channel state information transmission for the component carrier uses the same transmission mode and the same number of transmit antennas and/or receive antennas as a channel state information transmission for at least one other component carrier. Upon determining that the condition is not met, the P-CSI reporting module 870 and/or P-CSI condition monitoring module 885 may periodically transmit the channel state information according to default reporting rules, as described, for example, with reference to FIG. 5. Upon determining that the condition is met, the P-CSI reporting module 870 and/or P-CSI condition monitoring module 885 may be used to periodically transmit the channel state information with an indication used to identify the component carrier associated with the channel state information. In this manner, ambiguity for a base station that receives the channel state information transmitted by the apparatus 805 may be lessened or mitigated. In particular, when the channel state information for at least a first component carrier and the channel state information transmission for at least a second component carrier have the same payload size, the apparatus 805 may transmit channel state information with an indication used to identify the component carrier associated with the channel state information.

The eighth mode of operation of the apparatus 805 may be useful, in one respect, because channel state information may be periodically transmitted with an indication that removes ambiguity regarding the component carrier to which it pertains.

Figure 9:
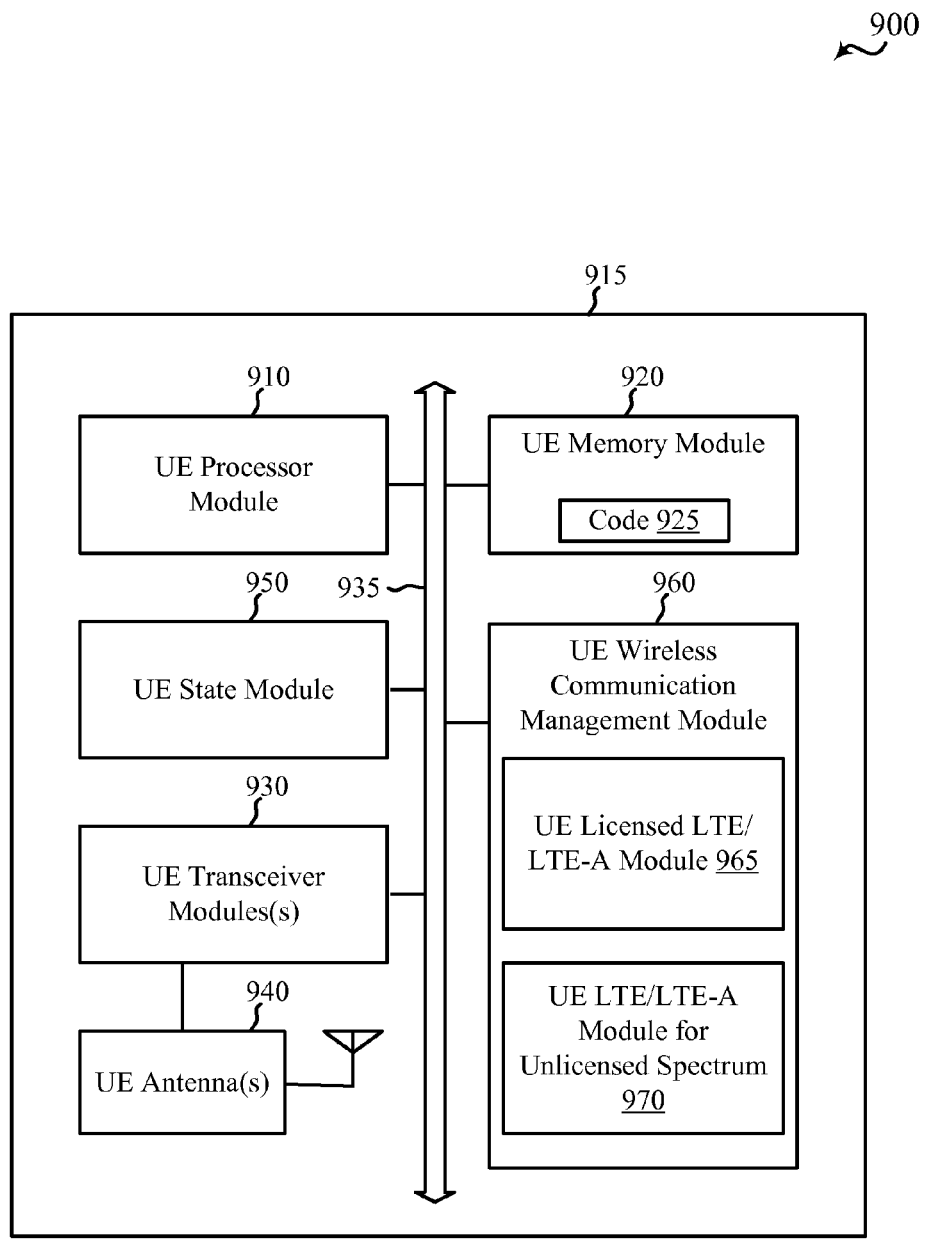
FIG. 9 shows a block diagram of a UE for use in wireless communication, in accordance with various aspects of the present disclosure.

FIG. 9 shows a block diagram 900 of a UE 915 for use in wireless communication, in accordance with various aspects of the present disclosure. The UE 915 may have various configurations and may be included or be part of a personal computer (e.g., a laptop computer, a netbook computer, a tablet computer, etc.), a cellular telephone, a PDA, a digital video recorder (DVR), an internet appliance, a gaming console, an e-reader, etc. The UE 915 may, in some examples, have an internal power supply (not shown), such as a small battery, to facilitate mobile operation. In some examples, the UE 915 may be an example of aspects of one or more of the UEs 115 and/or 215 described with reference to FIGS. 1 and/or 2, and/or aspects of the apparatus 605, 705, and/or 805 described with reference to FIGS. 6, 7, and/or 8. The UE 915 may be configured to implement at least some of the UE and/or apparatus features and functions described with reference to FIGS. 1, 2, 3, 4, 5B, 6, 7, and/or 8.

The UE 915 may include a UE processor module 910, a UE memory module 920, at least one UE transceiver module (represented by UE transceiver module(s) 930), at least one UE antenna (represented by UE antenna(s) 940), and/or a UE wireless communication management module 960. Each of these components may be in communication with each other, directly or indirectly, over one or more buses 935.

The UE memory module 920 may include random access memory (RAM) and/or read-only memory (ROM). The UE memory module 920 may store computer-readable, computer-executable code 925 containing instructions that are configured to, when executed, cause the UE processor module 910 to perform various functions described herein related to wireless communication and/or channel state information reporting. Alternatively, the code 925 may not be directly executable by the UE processor module 910 but be configured to cause the UE 915 (e.g., when compiled and executed) to perform various of the functions described herein.

The UE processor module 910 may include an intelligent hardware device, e.g., a CPU, a microcontroller, an ASIC, etc.). The UE processor module 910 may process information received through the UE transceiver module(s) 930 and/or information to be sent to the UE transceiver module(s) 930 for transmission through the UE antenna(s) 940. The UE processor module 910 may handle, alone or in connection with the UE wireless communication management module 960, various aspects of communicating over (or managing communications over) a first radio frequency spectrum band (e.g., a radio frequency spectrum band for which apparatuses do not contend for access because the radio frequency spectrum band is licensed to particular users for particular uses, such as a licensed radio frequency spectrum band usable for LTE/LTE-A communications) and/or a second radio frequency spectrum band (e.g., a radio frequency spectrum band for which apparatuses may need to contend for access because the radio frequency spectrum band is available for unlicensed use, such as a Wi-Fi radio frequency spectrum band and/or another unlicensed radio frequency spectrum band usable for LTE/LTE-A communications).

The UE transceiver module(s) 930 may include a modem configured to modulate packets and provide the modulated packets to the UE antenna(s) 940 for transmission, and to demodulate packets received from the UE antenna(s) 940. The UE transceiver module(s) 930 may, in some examples, be implemented as one or more UE transmitter modules and one or more separate UE receiver modules. The UE transceiver module(s) 930 may support communications in the first radio frequency spectrum band and/or the second radio frequency spectrum band. The UE transceiver module(s) 930 may be configured to communicate bi-directionally, via the UE antenna(s) 940, with one or more of the base stations 105 and/or 205 described with reference to FIGS. 1 and/or 2. While the UE 915 may include a single UE antenna, there may be examples in which the UE 915 may include multiple UE antennas 940.

The UE state module 950 may be used, for example, to manage transitions of the UE 915 between a radio resource control (RRC) idle state and an RRC connected state, and may be in communication with other components of the UE 915, directly or indirectly, over the one or more buses 935. The UE state module 950, or portions of it, may include a processor, and/or some or all of the functions of the UE state module 950 may be performed by the UE processor module 910 and/or in connection with the UE processor module 910.

The UE wireless communication management module 960 may be configured to perform and/or control some or all of the features and/or functions described with reference to FIGS. 1, 2, 3, 4A, 4B, 5, 6, 7, and/or 8 related to wireless communication over the first radio frequency spectrum band and/or the second radio frequency spectrum band and/or channel state information reporting. For example, the UE wireless communication management module 960 may be configured to support a supplemental downlink mode, a carrier aggregation mode, and/or a standalone mode using the first radio frequency spectrum band and/or the second radio frequency spectrum band. The UE wireless communication management module 960 may also be configured to support a reporting of aperiodic channel state information and/or periodic channel state information. The UE wireless communication management module 960 may include a UE licensed LTE/LTE-A module 965 configured to handle LTE/LTE-A communications in the first radio frequency spectrum band, and a UE LTE/LTE-A module for unlicensed spectrum 970 configured to handle LTE/LTE-A communications in the second radio frequency spectrum. The UE wireless communication management module 960, or portions of it, may include a processor, and/or some or all of the functions of the UE wireless communication management module 960 may be performed by the UE processor module 910 and/or in connection with the UE processor module 910. In some examples, the UE wireless communication management module 960 may be an example of the wireless communication management module 620, 720, and/or 820 described with reference to FIGS. 6, 7, and/or 8.

Figure 10:
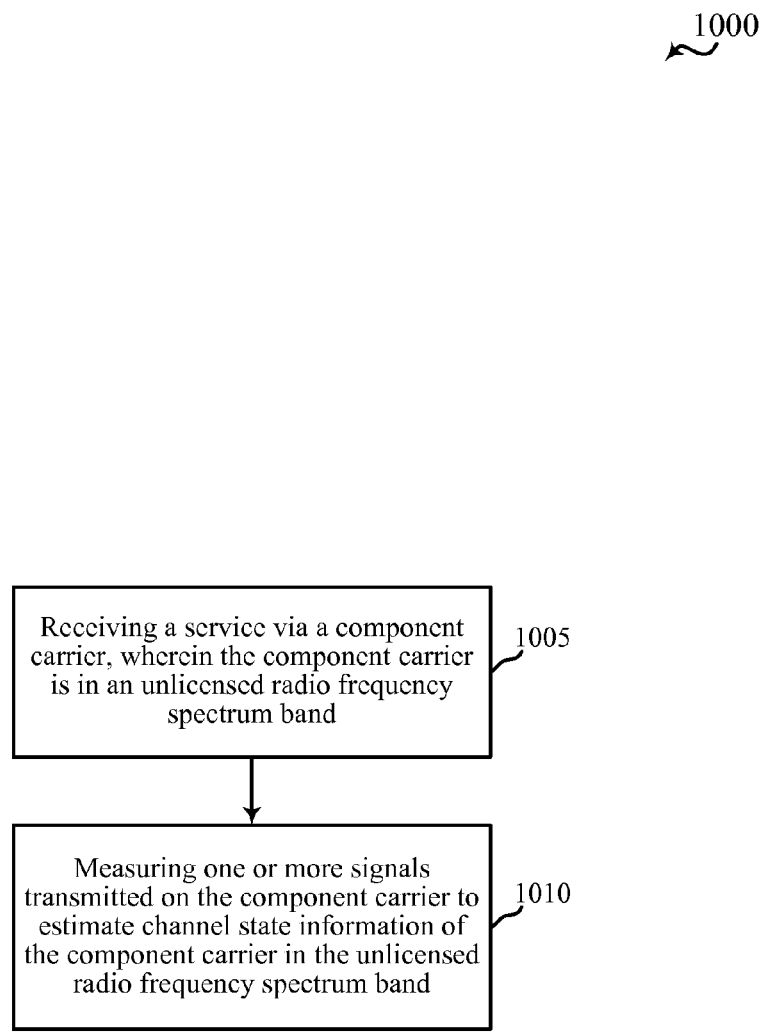
FIG. 10 is a flow chart illustrating an example of a method for wireless communication, in accordance with various aspects of the present disclosure.

FIG. 10 is a flow chart illustrating an example of a method 1000 for wireless communication, in accordance with various aspects of the present disclosure. For clarity, the method 1000 is described below with reference to aspects of one or more of the UEs 115, 215, and/or 915 described with reference to FIGS. 1, 2, and/or 9, and/or aspects of one or more of the apparatuses 605, 705, and/or 805 described with reference to FIGS. 6, 7, and/or 8. In some examples, a UE and/or apparatus may execute one or more sets of codes to control the functional elements of the base station and/or apparatus to perform the functions described below.

At block 1005, the method 1000 may include receiving (e.g., from a base station) a service via a component carrier. The component carrier may be in an unlicensed radio frequency spectrum band (e.g., a radio frequency spectrum band for which apparatuses may need to contend for access because the radio frequency spectrum band is available for unlicensed use, such as a Wi-Fi radio frequency spectrum band). In some examples, the service (or one or more other services) may be received via one or more additional component carriers in the unlicensed radio frequency spectrum band and/or one or more component carriers in a licensed radio frequency spectrum band (e.g., a radio frequency spectrum band for which apparatuses do not contend for access because the spectrum band is licensed to particular users for particular uses). The operation(s) at block 1005 may be performed using the wireless communication management module 620, 720, 820, and/or 960 described with reference to FIGS. 6, 7, 8, and/or 9, and/or the component carrier management module 735 and/or 840 described with reference to FIGS. 7 and/or 8.

At block 1010, the method 1000 may include measuring one or more signals transmitted on the component carrier to estimate channel state information of the component carrier in the unlicensed radio frequency spectrum band. The operation(s) at block 1010 may be performed using the wireless communication management module 620, 720, 820, and/or 960 described with reference to FIGS. 6, 7, 8, and/or 9, and/or the component carrier signal measurement module 740 and/or 845 described with reference to FIGS. 7 and/or 8.

Thus, the method 1000 may provide for wireless communication. It should be noted that the method 1000 is just one implementation and that the operations of the method 1000 may be rearranged or otherwise modified such that other implementations are possible.

Figure 11:
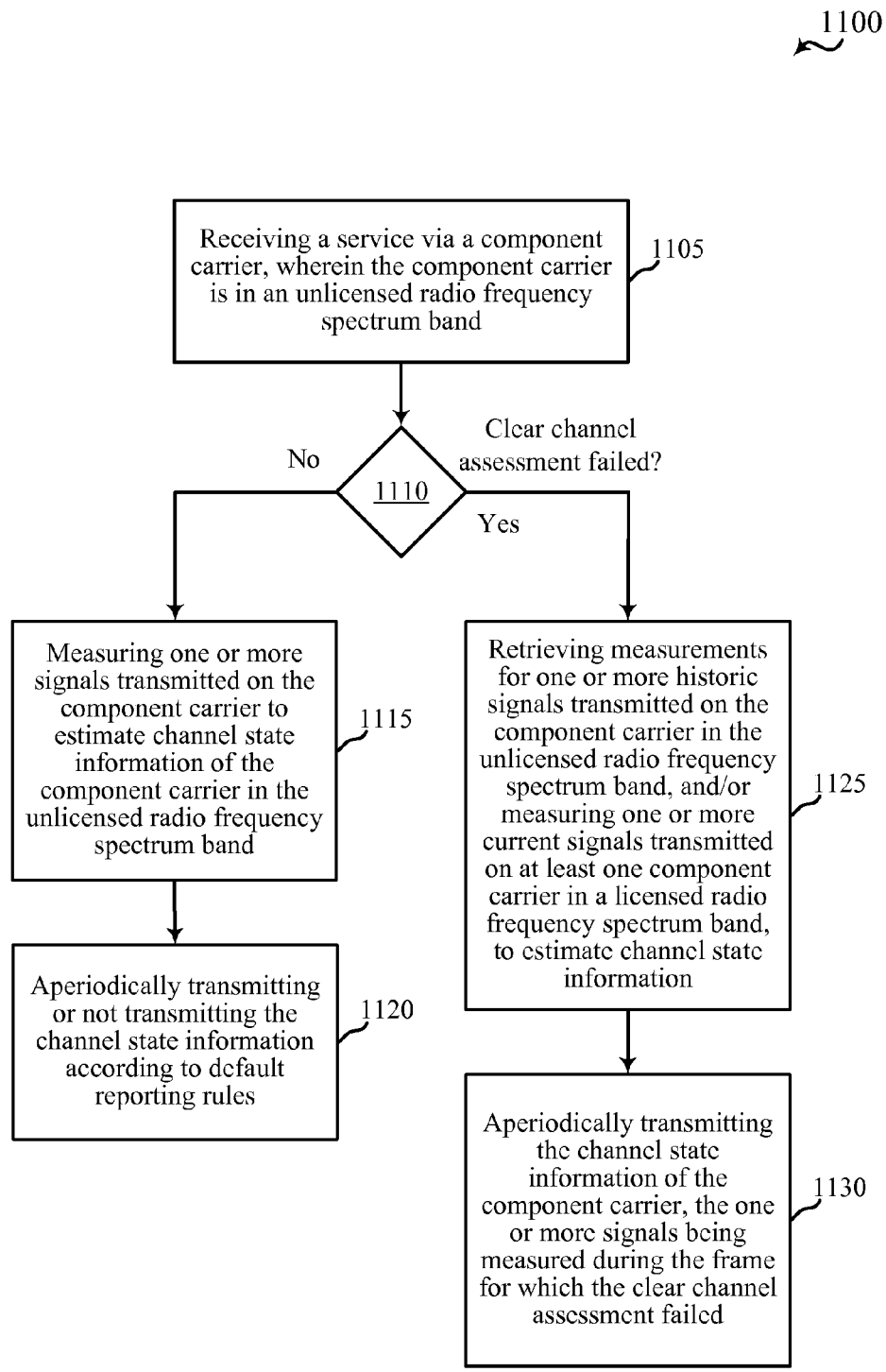
FIG. 11 is a flow chart illustrating an example of a method for wireless communication, in accordance with various aspects of the present disclosure.

FIG. 11 is a flow chart illustrating an example of a method 1100 for wireless communication, in accordance with various aspects of the present disclosure. For clarity, the method 1100 is described below with reference to aspects of one or more of the UEs 115, 215, and/or 915 described with reference to FIGS. 1, 2, and/or 9, and/or aspects of one or more of the apparatuses 605, 705, and/or 805 described with reference to FIGS. 6, 7, and/or 8. In some examples, a UE and/or apparatus may execute one or more sets of codes to control the functional elements of the base station and/or apparatus to perform the functions described below.

At block 1105, the method 1100 may include receiving (e.g., from a base station) a service via a component carrier. The component carrier may be in an unlicensed radio frequency spectrum band (e.g., a radio frequency spectrum band for which apparatuses may need to contend for access because the radio frequency spectrum band is available for unlicensed use, such as a Wi-Fi radio frequency spectrum band). In some examples, the service (or one or more other services) may also be received via one or more additional component carriers in the unlicensed radio frequency spectrum band and/or one or more component carriers in a licensed radio frequency spectrum band (e.g., a radio frequency spectrum band for which apparatuses do not contend for access because the spectrum band is licensed to particular users for particular uses). The operation(s) at block 1105 may be performed using the wireless communication management module 620, 720, 820, and/or 960 described with reference to FIGS. 6, 7, 8, and/or 9, and/or the component carrier management module 735 and/or 840 described with reference to FIGS. 7 and/or 8.

At block 1110, the method 1100 may include determining whether a clear channel assessment failed for a frame for the component carrier. The frame for the component carrier may be a downlink frame or an uplink frame. In some examples, the determining whether the clear channel assessment failed may be based at least in part on a channel usage beacon signal, a reference signal for a channel state information report, and/or other information received for the frame (any or all of which may be received from a base station over the component carrier in the unlicensed radio frequency spectrum band). The operation(s) at block 1110 may be performed using the wireless communication management module 620, 720, 820, and/or 960 described with reference to FIGS. 6, 7, 8, and/or 9, and/or the DCCA analysis module 835 described with reference to FIG. 8.

Upon determining that the clear channel assessment succeeded for the frame for the component carrier, and at block 1115, the method 1100 may include measuring one or more signals transmitted on the component carrier to estimate channel state information of the component carrier in the unlicensed radio frequency spectrum band. In some examples, the operation(s) at block 1115 may occur before the operation(s) at block 1110. The operation(s) at block 1110 may be performed using the wireless communication management module 620, 720, 820, and/or 960 described with reference to FIGS. 6, 7, 8, and/or 9, and/or the component carrier signal measurement module 740 and/or 845 described with reference to FIGS. 7 and/or 8.

At block 1120, the method 1100 may include aperiodically transmitting or not transmitting the channel state information according to default reporting rules, as described, for example, with reference to FIG. 5. The operation(s) at block 1120 may be performed using the wireless communication management module 620, 720, 820, and/or 960 described with reference to FIGS. 6, 7, 8, and/or 9, and/or the A-CSI reporting module 850 described with reference to FIG. 8.

Upon determining that the clear channel assessment failed for the frame for the at least one component carrier, and at block 1125, the method 1100 may include 1) retrieving measurements for one or more historic signals transmitted on the component carrier to estimate channel state information of the component carrier in the unlicensed radio frequency spectrum band (e.g., retrieving measurements based on a measuring of one or more historic signals associated with the component carrier to estimate channel state information), or 2) measuring one or more current signals transmitted on the component carrier to estimate channel state information of the component carrier in the unlicensed radio frequency spectrum band. In some examples, the operation(s) at block 1125 may occur before the operation(s) at block 1110. The operation(s) at block 1125 may be performed using the wireless communication management module 620, 720, 820, and/or 960 described with reference to FIGS. 6, 7, 8, and/or 9, and/or the component carrier signal measurement module 740 and/or 845 described with reference to FIGS. 7 and/or 8.

At block 1130, the method 1100 may include aperiodically transmitting the channel state information of the component carrier. The operation(s) at block 1130 may be performed using the wireless communication management module 620, 720, 820, and/or 960 described with reference to FIGS. 6, 7, 8, and/or 9, and/or the A-CSI reporting module 850 and/or A-CSI semi-static configuration module 855 described with reference to FIG. 8.

The method 1100 may be useful, in one respect, because the aperiodic transmission of channel state information is not dependent on a UE correctly determining whether a clear channel assessment failed. This may provide better alignment between a base station and a UE that are in communication over a component carrier, but at the expense of higher overhead—especially when a serving cell or cells for a component carrier in an unlicensed radio frequency spectrum band has/have a high probability of failed clear channel assessments. In some examples, a base station receiving the channel state information transmitted at block 1130 may discard channel state information that is not useful (e.g., because it corresponds to a clear channel assessment that actually failed).

Thus, the method 1100 may provide for wireless communication. It should be noted that the method 1100 is just one implementation and that the operations of the method 1100 may be rearranged or otherwise modified such that other implementations are possible.

Figure 12:
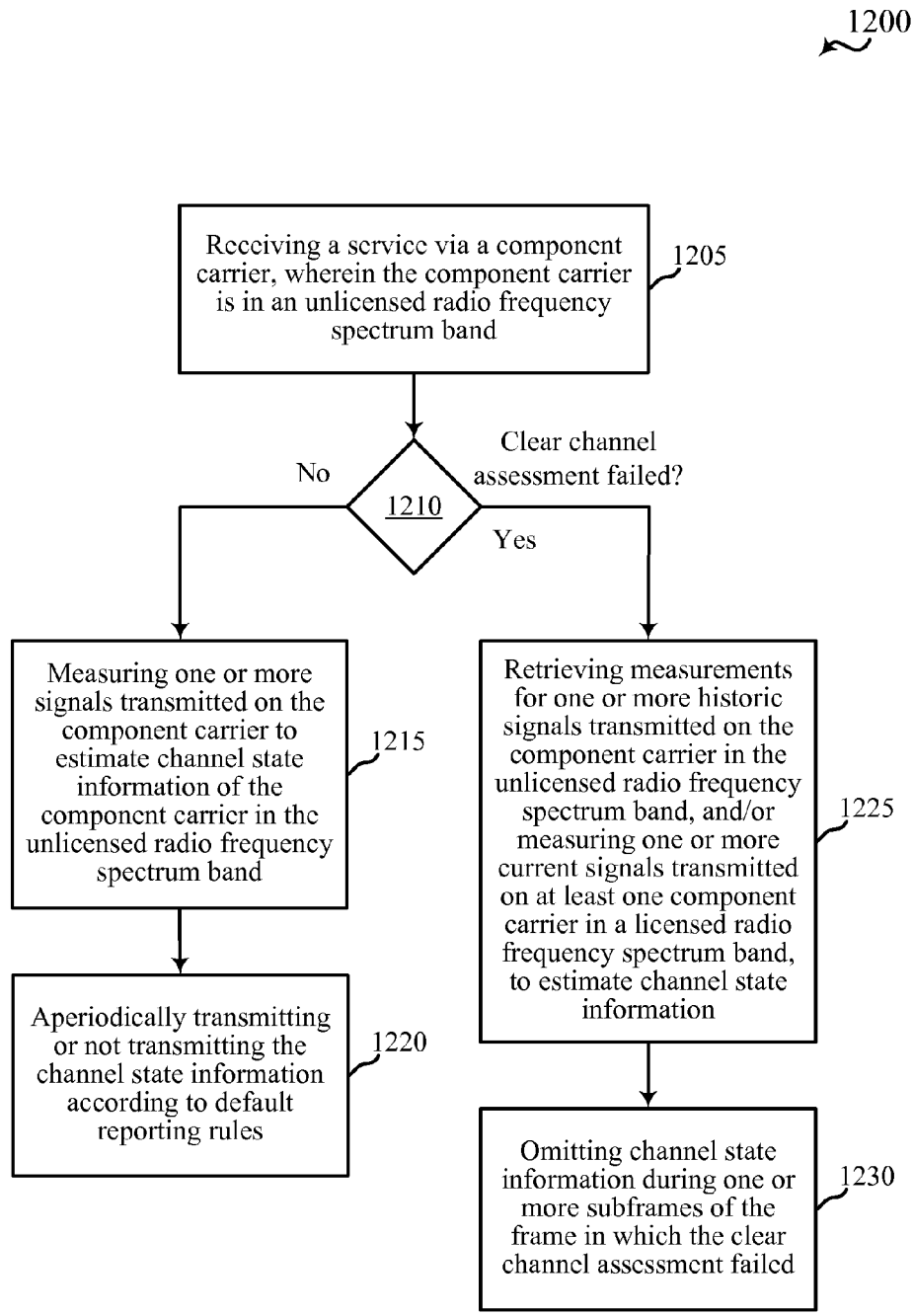
FIG. 12 is a flow chart illustrating an example of a method for wireless communication, in accordance with various aspects of the present disclosure.

FIG. 12 is a flow chart illustrating an example of a method 1200 for wireless communication, in accordance with various aspects of the present disclosure. For clarity, the method 1200 is described below with reference to aspects of one or more of the UEs 115, 215, and/or 915 described with reference to FIGS. 1, 2, and/or 9, and/or aspects of one or more of the apparatuses 605, 705, and/or 805 described with reference to FIGS. 6, 7, and/or 8. In some examples, a UE and/or apparatus may execute one or more sets of codes to control the functional elements of the base station and/or apparatus to perform the functions described below.

At block 1205, the method 1200 may include receiving (e.g., from a base station) a service via a component carrier. The component carrier may be in an unlicensed radio frequency spectrum band (e.g., a radio frequency spectrum band for which apparatuses may need to contend for access because the radio frequency spectrum band is available for unlicensed use, such as a Wi-Fi radio frequency spectrum band). In some examples, the service (or one or more other services) may also be received via one or more additional component carriers in the unlicensed radio frequency spectrum band and/or one or more component carriers in a licensed radio frequency spectrum band (e.g., a radio frequency spectrum band for which apparatuses do not contend for access because the spectrum band is licensed to particular users for particular uses). The operation(s) at block 1205 may be performed using the wireless communication management module 620, 720, 820, and/or 960 described with reference to FIGS. 6, 7, 8, and/or 9, and/or the component carrier management module 735 and/or 840 described with reference to FIGS. 7 and/or 8.

At block 1210, the method 1200 may include determining whether a clear channel assessment failed for a frame for the component carrier. The frame for the component carrier may be an uplink frame or a downlink frame. In some examples, the determining whether the clear channel assessment failed may be based at least in part on a channel usage beacon signal, a reference signal for a channel state information report, and/or other information received for the frame (any or all of which may be received from a base station over the component carrier in the unlicensed radio frequency spectrum band). The operation(s) at block 1210 may be performed using the wireless communication management module 620, 720, 820, and/or 960 described with reference to FIGS. 6, 7, 8, and/or 9, and/or the DCCA analysis module 835 described with reference to FIG. 8.

Upon determining that the clear channel assessment succeeded for the frame for the component carrier, and at block 1215, the method 1200 may include measuring one or more signals transmitted on the component carrier to estimate channel state information of the component carrier in the unlicensed radio frequency spectrum band. In some examples, the operation(s) at block 1215 may occur before the operation(s) at block 1210. The operation(s) at block 1215 may be performed using the wireless communication management module 620, 720, 820, and/or 960 described with reference to FIGS. 6, 7, 8, and/or 9, and/or the component carrier signal measurement module 740 and/or 845 described with reference to FIGS. 7 and/or 8.

At block 1220, the method 1200 may include aperiodically transmitting or not transmitting the channel state information according to default reporting rules, as described, for example, with reference to FIG. 5. The operation(s) at block 1220 may be performed using the wireless communication management module 620, 720, 820, and/or 960 described with reference to FIGS. 6, 7, 8, and/or 9, and/or the A-CSI reporting module 850 described with reference to FIG. 8.

Upon determining that the clear channel assessment failed for the frame for the at least one component carrier, and at block 1225, the method 1200 may include 1) retrieving measurements for one or more historic signals transmitted on the component carrier to estimate channel state information of the component carrier in the unlicensed radio frequency spectrum band (e.g., retrieving measurements based on a measuring of one or more historic signals associated with the component carrier to estimate channel state information), or 2) measuring one or more current signals transmitted on the component carrier to estimate channel state information of the component carrier in the unlicensed radio frequency spectrum band. In some examples, the operation(s) at block 1225 may occur before the operation(s) at block 1210. The operation(s) at block 1225 may be performed using the wireless communication management module 620, 720, 820, and/or 960 described with reference to FIGS. 6, 7, 8, and/or 9, and/or the component carrier signal measurement module 740 and/or 845 described with reference to FIGS. 7 and/or 8.

At block 1230, the method 1200 may include omitting an aperiodic transmission of the channel state information for one or more subframes of the frame for the component carrier. The operation(s) at block 1230 may be performed using the wireless communication management module 620, 720, 820, and/or 960 described with reference to FIGS. 6, 7, 8, and/or 9, and/or the A-CSI reporting module 850 and/or A-CSI semi-static configuration module 855 described with reference to FIG. 8.

Thus, the method 1200 may provide for wireless communication. It should be noted that the method 1200 is just one implementation and that the operations of the method 1200 may be rearranged or otherwise modified such that other implementations are possible.

Figure 13:
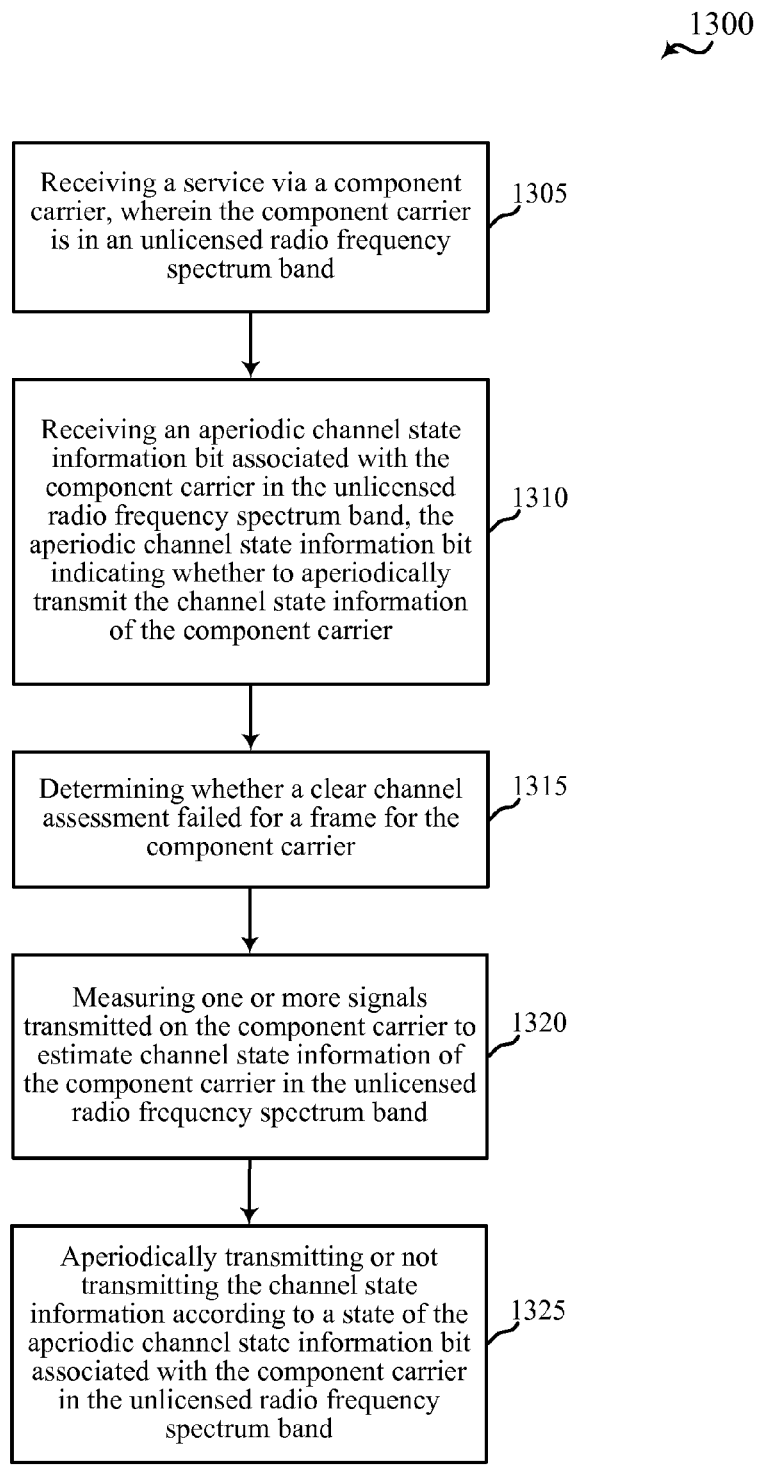
FIG. 13 is a flow chart illustrating an example of a method for wireless communication, in accordance with various aspects of the present disclosure.

FIG. 13 is a flow chart illustrating an example of a method 1300 for wireless communication, in accordance with various aspects of the present disclosure. For clarity, the method 1300 is described below with reference to aspects of one or more of the UEs 115, 215, and/or 915 described with reference to FIGS. 1, 2, and/or 9, and/or aspects of one or more of the apparatuses 605, 705, and/or 805 described with reference to FIGS. 6, 7, and/or 8. In some examples, a UE and/or apparatus may execute one or more sets of codes to control the functional elements of the base station and/or apparatus to perform the functions described below.

At block 1305, the method 1300 may include receiving (e.g., from a base station) a service via a component carrier. The component carrier may be in an unlicensed radio frequency spectrum band (e.g., a radio frequency spectrum band for which apparatuses may need to contend for access because the radio frequency spectrum band is available for unlicensed use, such as a Wi-Fi radio frequency spectrum band). In some examples, the service (or one or more other services) may also be received via one or more additional component carriers in the unlicensed radio frequency spectrum band and/or one or more component carriers in a licensed radio frequency spectrum band (e.g., a radio frequency spectrum band for which apparatuses do not contend for access because the spectrum band is licensed to particular users for particular uses). The operation(s) at block 1305 may be performed using the wireless communication management module 620, 720, 820, and/or 960 described with reference to FIGS. 6, 7, 8, and/or 9, and/or the component carrier management module 735 and/or 840 described with reference to FIGS. 7 and/or 8.

At block 1310, the method 1300 may include receiving an aperiodic channel state information bit associated with the component carrier in the unlicensed radio frequency spectrum band. The aperiodic channel state information bit may indicate whether to aperiodically transmit the channel state information of the component carrier. The aperiodic channel state information bit may be provided, for example, in a downlink and/or control transmission of a base station. In some examples, an aperiodic channel state information bit may be provided for each of a number of component carriers in the unlicensed radio frequency spectrum band. The operation(s) at block 1310 may be performed using the wireless communication management module 620, 720, 820, and/or 960 described with reference to FIGS. 6, 7, 8, and/or 9, and/or the A-CSI reporting module 850 and/or A-CSI reporting bit management module 860 described with reference to FIG. 8.

At block 1315, the method 1300 may include determining whether a clear channel assessment failed for a frame for the component carrier. In some examples, the determining whether the clear channel assessment failed may be based at least in part on a channel usage beacon signal, a reference signal for a channel state information report, and/or other information received for the frame (any or all of which may be received from a base station over the component carrier in the unlicensed radio frequency spectrum band). In some instances, the frame for the component carrier may be a downlink frame. In some instances, the frame for the component carrier may be an uplink frame. The operation(s) at block 1315 may be performed using the wireless communication management module 620, 720, 820, and/or 960 described with reference to FIGS. 6, 7, 8, and/or 9, and/or the DCCA analysis module 835 described with reference to FIG. 8.

At block 1320, the method 1300 may include measuring one or more signals transmitted on the component carrier to estimate channel state information of the component carrier in the unlicensed radio frequency spectrum band. In some examples, the operation(s) at block 1320 may occur before the operation(s) at block 1315. The operation(s) at block 1320 may be performed using the wireless communication management module 620, 720, 820, and/or 960 described with reference to FIGS. 6, 7, 8, and/or 9, and/or the component carrier signal measurement module 740 and/or 845 described with reference to FIGS. 7 and/or 8.

At block 1325, the method 1300 may include aperiodically transmitting or not transmitting the channel state information according to a state of the aperiodic channel state information bit associated with the component carrier in the unlicensed radio frequency spectrum band. For example, the channel state information may be transmitted when the state of the aperiodic channel state information bit is a logic "1," and not transmitted when the state of the aperiodic channel state information bit is a logic "0." The operation(s) at block 1325 may be performed using the wireless communication management module 620, 720, 820, and/or 960 described with reference to FIGS. 6, 7, 8, and/or 9, and/or the A-CSI reporting module 850 and/or A-CSI reporting bit management module 860 described with reference to FIG. 8.

The method 1300 may be useful, in one respect, because the aperiodic transmission of channel state information is not dependent on a UE correctly determining whether a clear channel assessment failed, but is instead based on an explicit indication (e.g., from a base station) of whether channel state information should be transmitted. This may provide better alignment between a base station and a UE that are in communication over a component carrier.

Thus, the method 1300 may provide for wireless communication. It should be noted that the method 1300 is just one implementation and that the operations of the method 1300 may be rearranged or otherwise modified such that other implementations are possible.

Figure 14:
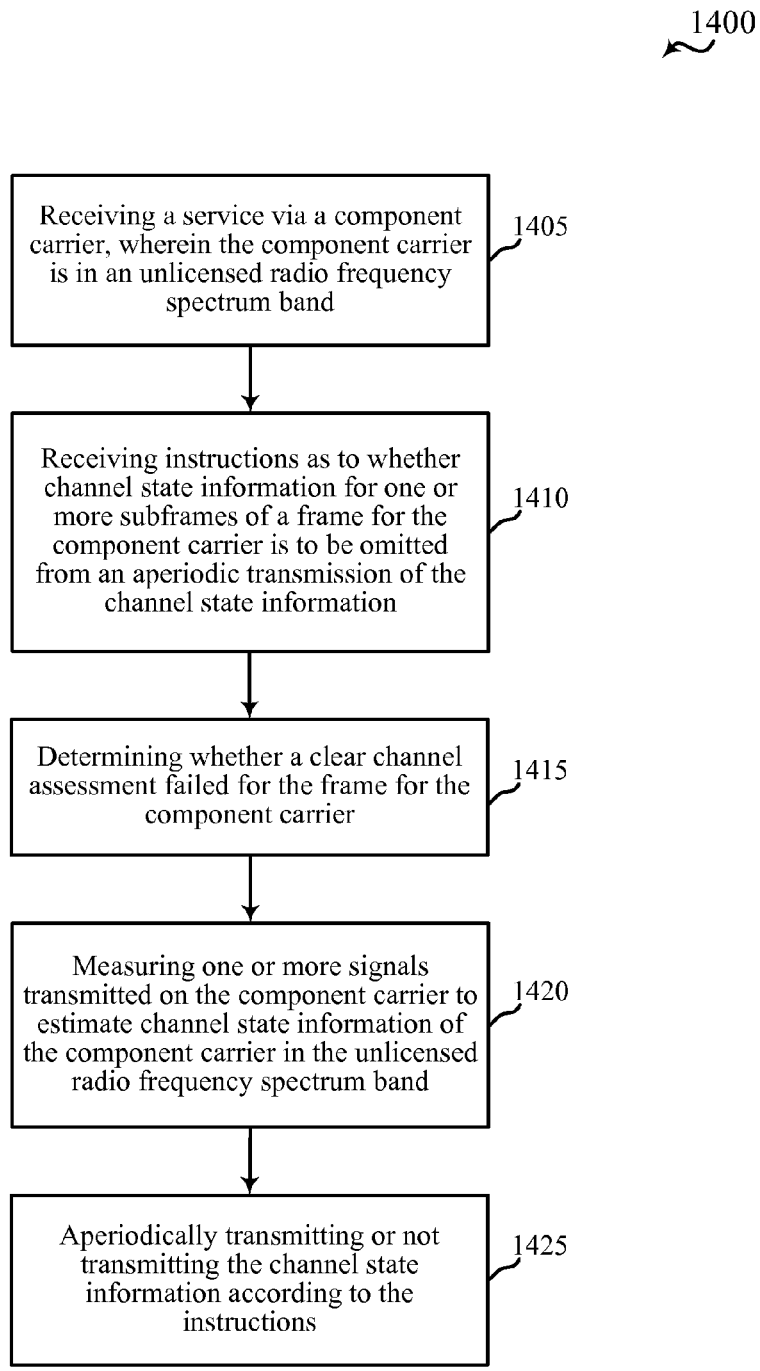
FIG. 14 is a flow chart illustrating an example of a method for wireless communication, in accordance with various aspects of the present disclosure.

FIG. 14 is a flow chart illustrating an example of a method 1400 for wireless communication, in accordance with various aspects of the present disclosure. For clarity, the method 1400 is described below with reference to aspects of one or more of the UEs 115, 215, and/or 915 described with reference to FIGS. 1, 2, and/or 9, and/or aspects of one or more of the apparatuses 605, 705, and/or 805 described with reference to FIGS. 6, 7, and/or 8. In some examples, a UE and/or apparatus may execute one or more sets of codes to control the functional elements of the base station and/or apparatus to perform the functions described below.

At block 1405, the method 1400 may include receiving (e.g., from a base station) a service via a component carrier. The component carrier may be in an unlicensed radio frequency spectrum band (e.g., a radio frequency spectrum band for which apparatuses may need to contend for access because the radio frequency spectrum band is available for unlicensed use, such as a Wi-Fi radio frequency spectrum band). In some examples, the service (or one or more other services) may also be received via one or more additional component carriers in the unlicensed radio frequency spectrum band and/or one or more component carriers in a licensed radio frequency spectrum band (e.g., a radio frequency spectrum band for which apparatuses do not contend for access because the spectrum band is licensed to particular users for particular uses). The operation(s) at block 1405 may be performed using the wireless communication management module 620, 720, 820, and/or 960 described with reference to FIGS. 6, 7, 8, and/or 9, and/or the component carrier management module 735 and/or 840 described with reference to FIGS. 7 and/or 8.

At block 1410, the method 1400 may include receiving instructions as to whether channel state information for one or more subframes of a frame (e.g., a downlink frame or an uplink frame) for the component carrier is to be omitted from an aperiodic transmission of the channel state information. The instructions may be provided, for example, in a downlink and/or control transmission of a base station. In some examples, the instructions may indicate that (or when) channel state information is to be transmitted regardless of whether a clear channel assessment is determined to have failed for a frame for the component carrier, or that (or when) an aperiodic transmission of channel state information is to be omitted when a clear channel assessment is determined to have failed for the component carrier. In some examples, the component carrier may be a first component carrier and the instructions may be received over a second component carrier. The first component carrier and the second component carrier may be associated with the same or different base stations. The operation(s) at block 1410 may be performed using the wireless communication management module 620, 720, 820, and/or 960 described with reference to FIGS. 6, 7, 8, and/or 9, and/or the A-CSI reporting module 850 and/or A-CSI instruction management module 865 described with reference to FIG. 8.

At block 1415, the method 1400 may include determining whether a clear channel assessment failed for the frame for the component carrier. In some examples, the determining whether the clear channel assessment failed may be based at least in part on a channel usage beacon signal, a reference signal for a channel state information report, and/or other information received for the frame (any or all of which may be received from a base station over the component carrier in the unlicensed radio frequency spectrum band). The operation(s) at block 1415 may be performed using the wireless communication management module 620, 720, 820, and/or 960 described with reference to FIGS. 6, 7, 8, and/or 9, and/or the DCCA analysis module 835 described with reference to FIG. 8.

At block 1420, the method 1400 may include measuring one or more signals transmitted on the component carrier in the unlicensed radio frequency spectrum band to estimate channel state information of the component carrier in the unlicensed radio frequency spectrum band. In some examples, the operation(s) at block 1420 may occur before the operation(s) at block 1415. The operation(s) at block 1420 may be performed using the wireless communication management module 620, 720, 820, and/or 960 described with reference to FIGS. 6, 7, 8, and/or 9, and/or the component carrier signal measurement module 740 and/or 845 described with reference to FIGS. 7 and/or 8.

At block 1425, the method 1400 may include aperiodically transmitting or not transmitting the channel state information according to the instructions received at block 1410. The operation(s) at block 1425 may be performed using the wireless communication management module 620,

720, 820, and/or 960 described with reference to FIGS. 6, 7, 8, and/or 9, and/or the A-CSI reporting module 850 and/or A-CSI instruction management module 865 described with reference to FIG. 8.

The method 1400 may be useful, in one respect, because the aperiodic transmission of channel state information is configurable. For example, the method for aperiodically transmitting or not transmitting channel state information may be determined by a base station that does or does not want to receive the channel state information when a UE determines that a clear channel assessment failed for a frame for a component carrier in an unlicensed radio frequency spectrum band.

Thus, the method 1400 may provide for wireless communication. It should be noted that the method 1400 is just one implementation and that the operations of the method 1400 may be rearranged or otherwise modified such that other implementations are possible.

Figure 15:
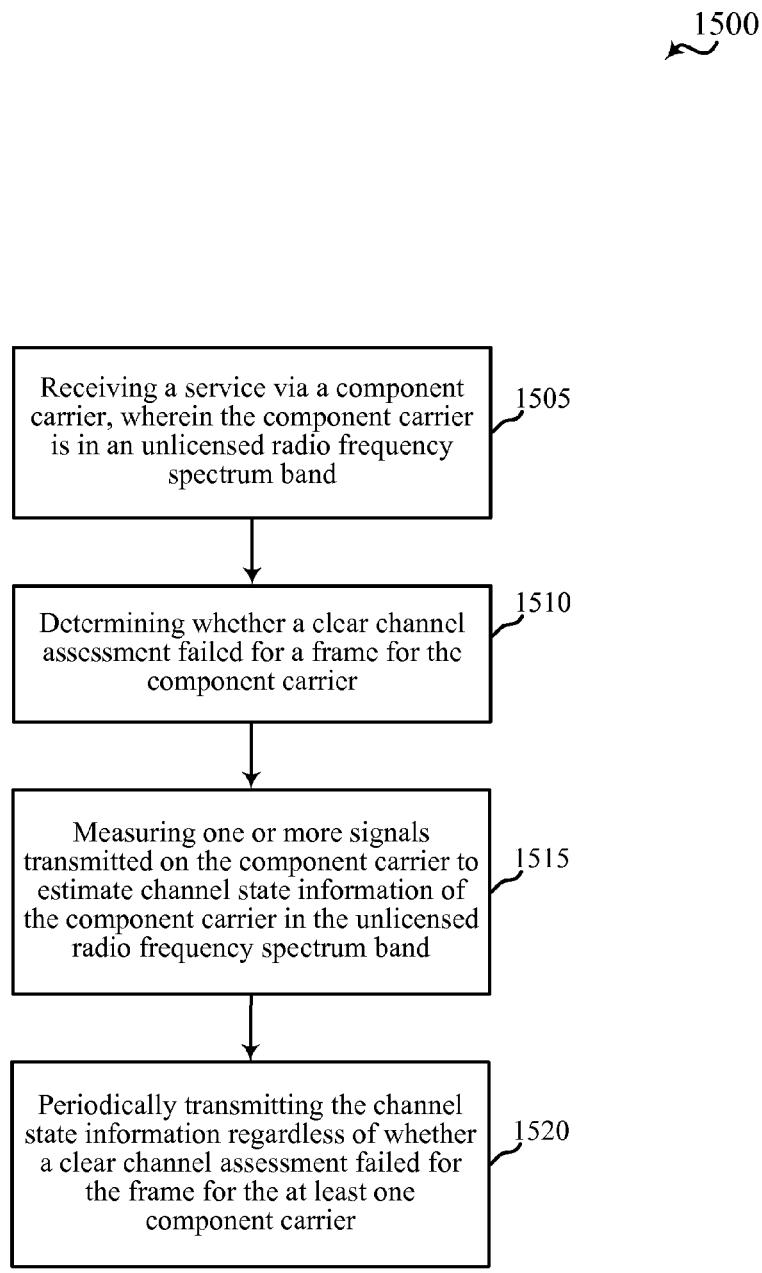
FIG. 15 is a flow chart illustrating an example of a method for wireless communication, in accordance with various aspects of the present disclosure.

FIG. 15 is a flow chart illustrating an example of a method 1500 for wireless communication, in accordance with various aspects of the present disclosure. For clarity, the method 1500 is described below with reference to aspects of one or more of the UEs 115, 215, and/or 915 described with reference to FIGS. 1, 2, and/or 9, and/or aspects of one or more of the apparatuses 605, 705, and/or 805 described with reference to FIGS. 6, 7, and/or 8. In some examples, a UE and/or apparatus may execute one or more sets of codes to control the functional elements of the base station and/or apparatus to perform the functions described below.

At block 1505, the method 1500 may include receiving (e.g., from a base station) a service via a component carrier. The component carrier may be in an unlicensed radio frequency spectrum band (e.g., a radio frequency spectrum band for which apparatuses may need to contend for access because the radio frequency spectrum band is available for unlicensed use, such as a Wi-Fi radio frequency spectrum band). In some examples, the service (or one or more other services) may also be received via one or more additional component carriers in the unlicensed radio frequency spectrum band and/or one or more component carriers in a licensed radio frequency spectrum band (e.g., a radio frequency spectrum band for which apparatuses do not contend for access because the spectrum band is licensed to particular users for particular uses). The operation(s) at block 1505 may be performed using the wireless communication management module 620, 720, 820, and/or 960 described with reference to FIGS. 6, 7, 8, and/or 9, and/or the component carrier management module 735 and/or 840 described with reference to FIGS. 7 and/or 8.

At block 1510, the method 1500 may include determining whether a clear channel assessment failed for a frame (e.g., a downlink frame or an uplink frame) for the component carrier. In some examples, the determining whether the clear channel assessment failed may be based at least in part on a channel usage beacon signal, a reference signal for a channel state information report, and/or other information received for the frame (any or all of which may be received from a base station over the at least one component carrier in the unlicensed radio frequency spectrum band). The operation(s) at block 1510 may be performed using the wireless communication management module 620, 720, 820, and/or 960 described with reference to FIGS. 6, 7, 8, and/or 9, and/or the DCCA analysis module 835 described with reference to FIG. 8.

At block 1515, the method 1500 may include measuring one or more signals transmitted on the component carrier to estimate channel state information of the component carrier in the unlicensed radio frequency spectrum band. In some examples, the operation(s) at block 1515 may occur before the operation(s) at block 1510. The operation(s) at block 1510 may be performed using the wireless communication management module 620, 720, 820, and/or 960 described with reference to FIGS. 6, 7, 8, and/or 9, and/or the component carrier signal measurement module 740 and/or 845 described with reference to FIGS. 7 and/or 8.

At block 1520, the method 1500 may include periodically transmitting the channel state information regardless of whether a clear channel assessment failed for the frame for the component carrier. The operation(s) at block 1520 may be performed using the wireless communication management module 620, 720, 820, and/or 960 described with reference to FIGS. 6, 7, 8, and/or 9, and/or the P-CSI reporting module 870 and/or P-CSI semi-static configuration module 875 described with reference to FIG. 8.

The method 1500 may be useful, in one respect, because the periodic transmission of channel state information is not dependent on a UE correctly determining whether a clear channel assessment failed. This may provide better alignment between a base station and a UE that are in communication over a component carrier.

Thus, the method 1500 may provide for wireless communication. It should be noted that the method 1500 is just one implementation and that the operations of the method 1500 may be rearranged or otherwise modified such that other implementations are possible.

Figure 16:
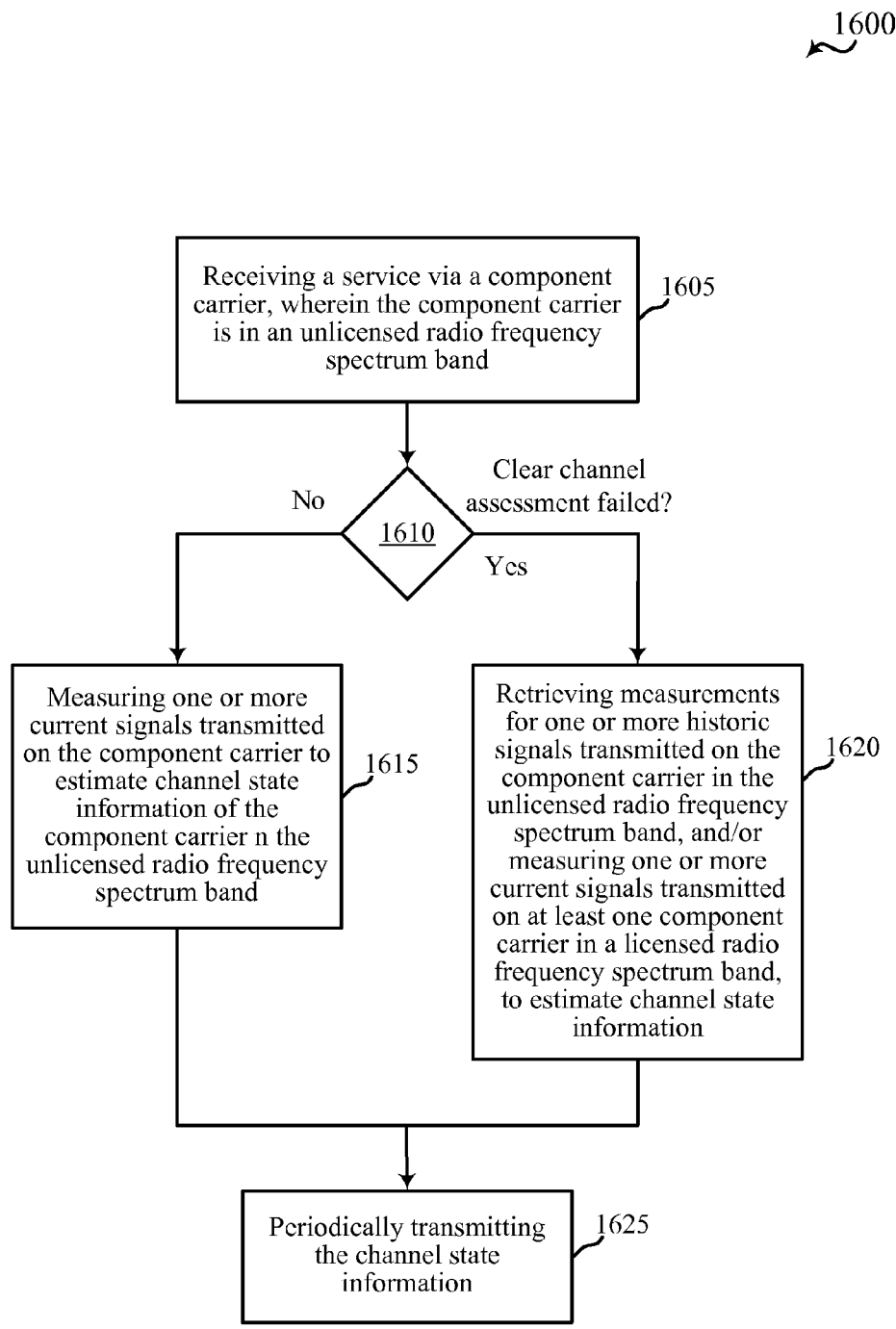
FIG. 16 is a flow chart illustrating an example of a method for wireless communication, in accordance with various aspects of the present disclosure.

FIG. 16 is a flow chart illustrating an example of a method 1600 for wireless communication, in accordance with various aspects of the present disclosure. For clarity, the method 1600 is described below with reference to aspects of one or more of the UEs 115, 215, and/or 915 described with reference to FIGS. 1, 2, and/or 9, and/or aspects of one or more of the apparatuses 605, 705, and/or 805 described with reference to FIGS. 6, 7, and/or 8. In some examples, a UE and/or apparatus may execute one or more sets of codes to control the functional elements of the base station and/or apparatus to perform the functions described below.

At block 1605, the method 1600 may include receiving (e.g., from a base station) a service via a component carrier. The component carrier may be in an unlicensed radio frequency spectrum band (e.g., a radio frequency spectrum band for which apparatuses may need to contend for access because the radio frequency spectrum band is available for unlicensed use, such as a Wi-Fi radio frequency spectrum band). In some examples, the service (or one or more other services) may also be received via one or more additional component carriers in the unlicensed radio frequency spectrum band and/or one or more component carriers in a licensed radio frequency spectrum band (e.g., a radio frequency spectrum band for which apparatuses do not contend for access because the spectrum band is licensed to particular users for particular uses). The operation(s) at block 1605 may be performed using the wireless communication management module 620, 720, 820, and/or 960 described with reference to FIGS. 6, 7, 8, and/or 9, and/or the component carrier management module 735 and/or 840 described with reference to FIGS. 7 and/or 8.

At block 1610, the method 1600 may include determining whether a clear channel assessment failed for a frame for the component carrier. The frame may be an uplink frame or a downlink frame. In some examples, the determining whether the clear channel assessment failed may be based at least in part on a channel usage beacon signal, a reference signal for a channel state information report, and/or other information received for the frame (any or all of which may be received from a base station over the component carrier in the unlicensed radio frequency spectrum band). The operation(s) at block 1610 may be performed using the wireless communication management module 620, 720, 820, and/or 960 described with reference to FIGS. 6, 7, 8, and/or 9, and/or the DCCA analysis module 835 described with reference to FIG. 8.

Upon determining that the clear channel assessment succeeded for the frame for the component carrier, and at block 1615, the method 1600 may include measuring one or more current signals transmitted on the component carrier to estimate channel state information in the unlicensed radio frequency spectrum band (e.g., measuring one or more signals associated with the frame for which the determination was made at block 1610). The operation(s) at block 1615 may be performed using the wireless communication management module 620, 720, 820, and/or 960 described with reference to FIGS. 6, 7, 8, and/or 9, and/or the component carrier signal measurement module 740 and/or 845 described with reference to FIGS. 7 and/or 8.

Upon determining that the clear channel assessment failed for the frame for the component carrier, and at block 1620, the method 1600 may include 1) retrieving measurements for one or more historic signals transmitted on the component carrier to estimate channel state information of the component carrier in the unlicensed radio frequency spectrum band (e.g., retrieving measurements based on a measuring of one or more historic signals associated with the component carrier to estimate channel state information), or 2) measuring one or more current signals associated with the component carrier to estimate channel state information of the component carrier in the unlicensed radio frequency spectrum band. In some examples, the operation(s) at block 1125 may occur before the operation(s) at block 1110. The operation(s) at block 1125 may be performed using the wireless communication management module 620, 720, 820, and/or 960 described with reference to FIGS. 6, 7, 8, and/or 9, and/or the component carrier signal measurement module 740 and/or 845 described with reference to FIGS. 7 and/or 8.

At block 1625, the method 1600 may include periodically transmitting or not transmitting the channel state information according to default reporting rules, as described, for example, with reference to FIG. 5. The operation(s) at block 1625 may be performed using the wireless communication management module 620, 720, 820, and/or 960 described with reference to FIGS. 6, 7, 8, and/or 9, and/or the P-CSI reporting module 870 described with reference to FIG. 8.

The method 1600 may be useful, in one respect, because the periodic transmission of channel state information is not dependent on a UE correctly determining whether a clear channel assessment failed. However, a base station receiving the channel state information transmitted at block 1625 may need to blindly detect which type of channel state information it receives from a UE. If a base station cannot detect which type of channel state information it receives from a UE, the base station may have to discard the channel state information.

Thus, the method 1600 may provide for wireless communication. It should be noted that the method 1600 is just one implementation and that the operations of the method 1600 may be rearranged or otherwise modified such that other implementations are possible.

Figure 17:
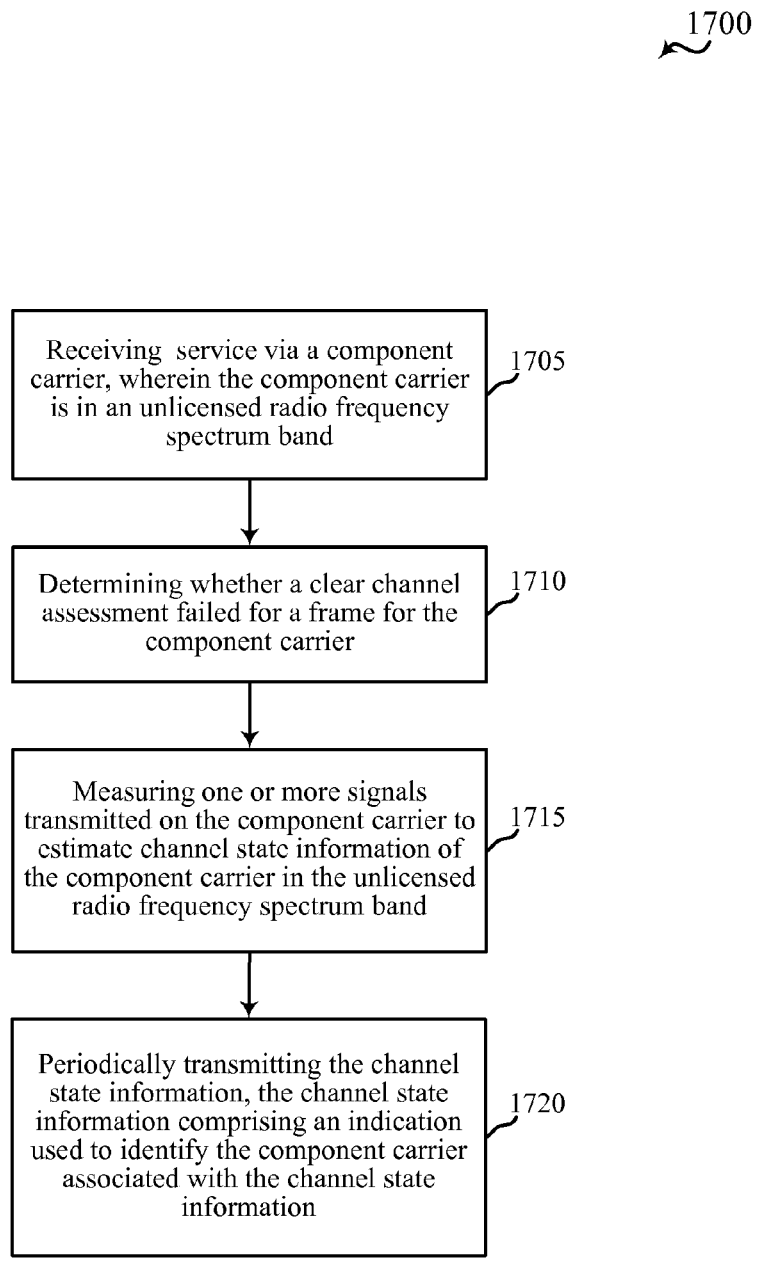
FIG. 17 is a flow chart illustrating an example of a method for wireless communication, in accordance with various aspects of the present disclosure.

FIG. 17 is a flow chart illustrating an example of a method 1700 for wireless communication, in accordance with various aspects of the present disclosure. For clarity, the method 1700 is described below with reference to aspects of one or more of the UEs 115, 215, and/or 915 described with reference to FIGS. 1, 2, and/or 9, and/or aspects of one or more of the apparatuses 605, 705, and/or 805 described with reference to FIGS. 6, 7, and/or 8. In some examples, a UE and/or apparatus may execute one or more sets of codes to control the functional elements of the base station and/or apparatus to perform the functions described below.

At block 1705, the method 1700 may include receiving (e.g., from a base station) a service via a component carrier. The component carrier may be in an unlicensed radio frequency spectrum band (e.g., a radio frequency spectrum band for which apparatuses may need to contend for access because the radio frequency spectrum band is available for unlicensed use, such as a Wi-Fi radio frequency spectrum band). In some examples, the service (or one or more other services) may also be received via one or more additional component carriers in the unlicensed radio frequency spectrum band and/or one or more component carriers in a licensed radio frequency spectrum band (e.g., a radio frequency spectrum band for which apparatuses do not contend for access because the spectrum band is licensed to particular users for particular uses). The operation(s) at block 1705 may be performed using the wireless communication management module 620, 720, 820, and/or 960 described with reference to FIGS. 6, 7, 8, and/or 9, and/or the component carrier management module 735 and/or 840 described with reference to FIGS. 7 and/or 8.

At block 1710, the method 1700 may include determining whether a clear channel assessment failed for a frame for the component carrier. In some examples, the determining whether the clear channel assessment failed may be based at least in part on a channel usage beacon signal, a reference signal for a channel state information report, and/or other information received for the frame (any or all of which may be received from a base station over the component carrier in the unlicensed radio frequency spectrum band). In some examples, the frame for the component carrier may be a downlink frame or an uplink frame. The operation(s) at block 1710 may be performed using the wireless communication management module 620, 720, 820, and/or 960 described with reference to FIGS. 6, 7, 8, and/or 9, and/or the DCCA analysis module 835 described with reference to FIG. 8.

At block 1715, the method 1700 may include measuring one or more signals transmitted on the component carrier to estimate channel state information of the component carrier in the unlicensed radio frequency spectrum band. In some examples, the operation(s) at block 1715 may occur before the operation(s) at block 1710. The operation(s) at block 1710 may be performed using the wireless communication management module 620, 720, 820, and/or 960 described with reference to FIGS. 6, 7, 8, and/or 9, and/or the component carrier signal measurement module 740 and/or 845 described with reference to FIGS. 7 and/or 8.

At block 1720, the method 1700 may include periodically transmitting the channel state information. In some examples, the channel state information may include an indication used to identify the component carrier associated with the channel state information regardless of whether the clear channel assessment failed for the frame for the component carrier. In other examples, the channel state information may include the indication used to identify the component carrier associated with the channel state information when the clear channel assessment performed at block 1710 is determined to have failed.

In some examples, the indication used to identify the component carrier associated with the channel state information may explicitly identify the component carrier associated with the channel state information.

In some examples, the indication used to identify the component carrier associated with the channel state information may implicitly identify the component carrier associated with the channel state information. For example, the indication used to identify the component carrier associated with the channel state information may include a scrambling pattern (e.g., a scrambling code) associated with the component carrier associated with the channel state information. In one particular example, the scrambling pattern may include a first scrambling pattern when the channel state information is associated with a primary cell, and the scrambling pattern may include a second scrambling pattern when the channel state information is associated with a secondary cell.

In another example, the indication used to identify the component carrier associated with the channel state information may include a rate matching for a multiplexed PUCCH and PUSCH and/or a PUCCH resource location. For example, a first rate matching may be used when the channel state information is associated with a primary cell, and a second rate matching may be used when the channel state information is associated with a secondary cell.

The operation(s) at block 1720 may be performed using the wireless communication management module 620, 720, 820, and/or 960 described with reference to FIGS. 6, 7, 8, and/or 9, and/or the P-CSI reporting module 870 and/or P-CSI component carrier indication module 880 described with reference to FIG. 8.

The method 1700 may be useful, in one respect, because channel state information is periodically transmitted with an indication that removes ambiguity regarding the component carrier to which it pertains.

Thus, the method 1700 may provide for wireless communication. It should be noted that the method 1700 is just one implementation and that the operations of the method 1700 may be rearranged or otherwise modified such that other implementations are possible.

Figure 18:
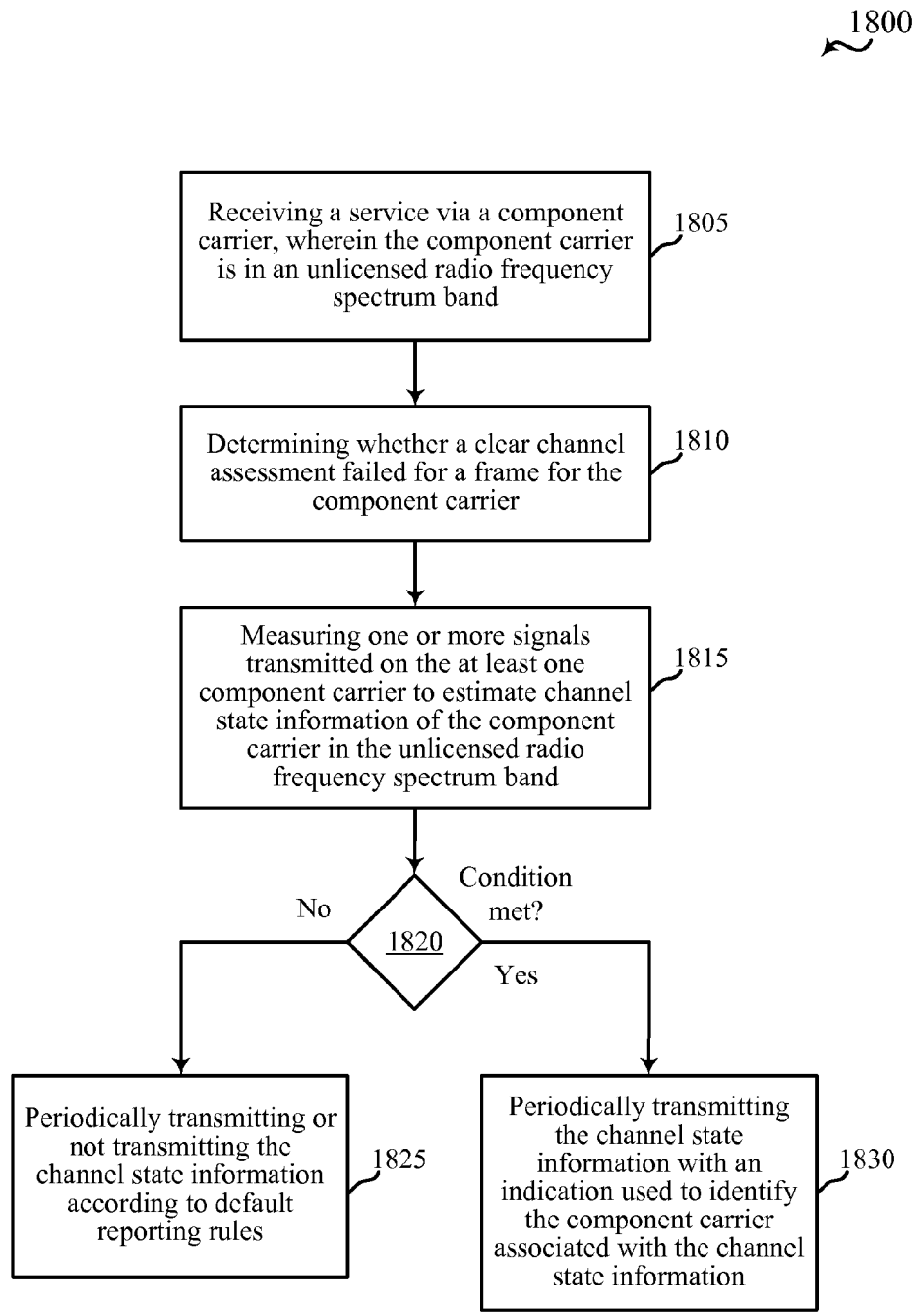
FIG. 18 is a flow chart illustrating an example of a method for wireless communication, in accordance with various aspects of the present disclosure.

FIG. 18 is a flow chart illustrating an example of a method 1800 for wireless communication, in accordance with various aspects of the present disclosure. For clarity, the method 1800 is described below with reference to aspects of one or more of the UEs 115, 215, and/or 915 described with reference to FIGS. 1, 2, and/or 9, and/or aspects of one or more of the apparatuses 605, 705, and/or 805 described with reference to FIGS. 6, 7, and/or 8. In some examples, a UE and/or apparatus may execute one or more sets of codes to control the functional elements of the base station and/or apparatus to perform the functions described below.

At block 1805, the method 1800 may include receiving (e.g., from a base station) a service via a component carrier. The component carrier may be in an unlicensed radio frequency spectrum band (e.g., a radio frequency spectrum band for which apparatuses may need to contend for access because the radio frequency spectrum band is available for unlicensed use, such as a Wi-Fi radio frequency spectrum band). In some examples, the service (or one or more other services) may also be received via one or more additional component carriers in the unlicensed radio frequency spectrum band and/or one or more component carriers in a licensed radio frequency spectrum band (e.g., a radio frequency spectrum band for which apparatuses do not contend for access because the spectrum band is licensed to particular users for particular uses). The operation(s) at block 1805 may be performed using the wireless communication management module 620, 720, 820, and/or 960 described with reference to FIGS. 6, 7, 8, and/or 9, and/or the component carrier management module 735 and/or 840 described with reference to FIGS. 7 and/or 8.

At block 1810, the method 1800 may include determining whether a clear channel assessment failed for a frame for the component carrier. In some examples, the determining whether the clear channel assessment failed may be based at least in part on a channel usage beacon signal, a reference signal for a channel state information report, and/or other information received for the frame (any or all of which may be received from a base station over the component carrier in the unlicensed radio frequency spectrum band). In some examples, the frame for the component carrier may be a downlink frame. In other examples, the frame for the component carrier may be an uplink frame. The operation(s) at block 1810 may be performed using the wireless communication management module 620, 720, 820, and/or 960 described with reference to FIGS. 6, 7, 8, and/or 9, and/or the DCCA analysis module 835 described with reference to FIG. 8.

At block 1815, the method 1800 may include measuring one or more signals transmitted on the component carrier to estimate channel state information of the component carrier in the unlicensed radio frequency spectrum band. In some examples, the operation(s) at block 1815 may occur before the operation(s) at block 1810. The operation(s) at block 1810 may be performed using the wireless communication management module 620, 720, 820, and/or 960 described with reference to FIGS. 6, 7, 8, and/or 9, and/or the component carrier signal measurement module 740 and/or 845 described with reference to FIGS. 7 and/or 8.

At block 1820, the method 1800 may include determining whether a condition is met. In one example, the condition may include a same payload size for at least two alternate channel state information transmissions. A same payload size may exist, for example, when a channel state information transmission for the component carrier uses the same transmission mode and the same number of transmit antennas and/or receive antennas as a channel state information transmission for at least one other component carrier. The operation(s) at block 1820 may be performed using the wireless communication management module 620, 720, 820, and/or 960 described with reference to FIGS. 6, 7, 8, and/or 9, and/or the P-CSI condition monitoring module 885 described with reference to FIG. 8.

Upon determining that the condition is not met, and at block 1825, the method 1800 may include periodically transmitting the channel state information according to default reporting rules, as described, for example, with reference to FIG. 5. The operation(s) at block 1825 may be performed using the wireless communication management module 620, 720, 820, and/or 960 described with reference to FIGS. 6, 7, 8, and/or 9, and/or the P-CSI reporting module 870 and/or P-CSI condition monitoring module 885 described with reference to FIG. 8.

Upon determining that the condition is met, and at block 1830, the method 1800 may include periodically transmitting the channel state information with an indication used to identify the component carrier associated with the channel state information. The operation(s) at block 1830 may be performed using the wireless communication management module 620, 720, 820, and/or 960 described with reference to FIGS. 6, 7, 8, and/or 9, and/or the P-CSI reporting module 870 and/or P-CSI condition monitoring module 885 described with reference to FIG. 8.

The operations at block 1820, block 1825, and/or block 1830 may be used to lessen or remove ambiguity for a base station that receives the channel state information transmitted in accordance with the method 1800. In particular, when the channel state information for at least a first component carrier and the channel state information transmission for at least a second component carrier have the same payload size, the method 1800 may transmit channel state information with an indication used to identify the component carrier associated with the channel state information.

In some examples, the indication used to identify the component carrier associated with the channel state information may explicitly identify the component carrier associated with the channel state information.

In some examples, the indication used to identify the component carrier associated with the channel state information may implicitly identify the component carrier associated with the channel state information. For example, the indication used to identify the component carrier associated with the channel state information may include a scrambling pattern (e.g., a scrambling code) associated with the component carrier associated with the channel state information. In one particular example, the scrambling pattern may include a first scrambling pattern when the channel state information is associated with a primary cell, and the scrambling pattern may include a second scrambling pattern when the channel state information is associated with a secondary cell.

In another example, the indication used to identify the component carrier associated with the channel state information may include a rate matching for a multiplexed PUCCH and PUSCH and/or a PUCCH resource location. For example, a first rate matching may be used when the channel state information is associated with a primary cell, and a second rate matching may be used when the channel state information is associated with a secondary cell.

The method 1800 may be useful, in one respect, because channel state information may be periodically transmitted with an indication that removes ambiguity regarding the component carrier to which it pertains.

Thus, the method 1800 may provide for wireless communication. It should be noted that the method 1800 is just one implementation and that the operations of the method 1800 may be rearranged or otherwise modified such that other implementations are possible.

In some examples, aspects of one or more of the methods 1000, 1100, 1200, 1300, 1400, 1500, 1600, 1700, and/or 1800 may be combined.

The detailed description set forth above in connection with the appended drawings describes examples and does not represent the only examples that may be implemented or that are within the scope of the claims. The terms "example" and "exemplary," when used in this description, mean "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure.

Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

What is claimed is:

1. A method for wireless communications, comprising:
   receiving a service via a component carrier, wherein the component carrier is in an unlicensed radio frequency spectrum band;
   determining that a clear channel assessment failed for a time interval associated with the component carrier; and
   measuring one or more signals transmitted on the component carrier to estimate channel state information of the component carrier in the unlicensed radio frequency spectrum band, the measuring being triggered when it is determined that the clear channel assessment failed.

2. The method of claim 1, wherein determining that the clear channel assessment failed for the time interval further comprises:
   determining that the clear channel assessment failed for a frame for the component carrier, wherein the frame is associated with the time interval.

3. The method of claim 2, further comprising:
   aperiodically transmitting the channel state information of the component carrier, wherein the one or more signals are measured during the frame for the component carrier.

4. The method of claim 2, further comprising:
   omitting an aperiodic transmission of the channel state information for one or more subframes of the frame for the component carrier.

5. The method of claim 1, further comprising:
   receiving an aperiodic channel state information bit associated with the component carrier in the unlicensed radio frequency spectrum band, the aperiodic channel state information bit indicating whether to aperiodically transmit the channel state information of the component carrier.

6. The method of claim 2, further comprising:
   receiving instructions as to whether channel state information for one or more subframes of the frame for the component carrier is to be omitted from an aperiodic transmission of the channel state information.

7. The method of claim 6, wherein the component carrier comprises a first component carrier, the method further comprising:
   receiving the instructions over a second component carrier.

8. The method of claim 1, further comprising:
   periodically transmitting the channel state information regardless of whether a clear channel assessment failed for the time interval associated with the component carrier.

9. The method of claim 1, further comprising:
   periodically transmitting the channel state information;
   wherein the measuring one or more signals comprises measuring one or more historic signals.

10. The method of claim 1, further comprising:
    periodically transmitting the channel state information, the channel state information comprising an indication used to identify the component carrier associated with the channel state information.

11. The method of claim 10, wherein the indication explicitly identifies the component carrier associated with the channel state information.

12. The method of claim 10, wherein the indication includes a scrambling pattern associated with the component carrier associated with the channel state information.

13. The method of claim 12, wherein:
    the scrambling pattern comprises a first scrambling pattern when the channel state information is associated with a primary cell; and
    the scrambling pattern comprises a second scrambling pattern when the channel state information is associated with a secondary cell.

14. The method of claim 10, wherein the indication comprises a rate matching for a multiplexed physical uplink control channel (PUCCH) and physical uplink shared channel (PUSCH).

15. The method of claim 10, wherein the indication comprises a resource location of a physical uplink control channel (PUCCH).

16. The method of claim 1, further comprising:
    determining whether a condition is met; and
    periodically transmitting the channel state information;
    wherein the channel state information comprises an indication used to identify the component carrier associated with the channel state information when the condition is met.

17. The method of claim 16, wherein the condition is a same payload size for at least two alternate channel state information transmissions.

18. The method of claim 1, further comprising:
    periodically transmitting the channel state information;
    wherein the channel state information comprises an indication used to identify the component carrier associated with the channel state information.

19. The method of claim 1, wherein the determining the clear channel assessment failed is based at least in part on a channel usage beacon signal.

20. The method of claim 1, wherein the determining the clear channel assessment failed is based at least in part on a reference signal for a channel state information report.

21. The method of claim 2, wherein the frame for the component carrier is a downlink frame or an uplink frame.

22. An apparatus for wireless communications, comprising:
    means for receiving a service via a component carrier, wherein the component carrier is in an unlicensed radio frequency spectrum band;
    means for determining that a clear channel assessment failed for a time interval associated with the component carrier; and
    means for measuring one or more signals transmitted on the component carrier to estimate channel state information of the component carrier in the unlicensed radio frequency spectrum band, the measuring being triggered when it is determined that the clear channel assessment failed.

23. The apparatus of claim 22, wherein the means for determining that the clear channel assessment failed for the time interval further comprises:
    means for determining that the clear channel assessment failed for a downlink frame for the component carrier, wherein the downlink frame is associated with the time interval.

24. The apparatus of claim 23, further comprising:
means for aperiodically transmitting the channel state information of the component carrier, wherein the one or more signals are measured during the frame for the component carrier.

25. The apparatus of claim 23, further comprising:
means for omitting an aperiodic transmission of the channel state information for one or more subframes of the frame for the component carrier.

26. An apparatus for wireless communications, comprising:
a processor;
memory in electronic communication with the processor; and
instructions stored in the memory, the instructions being executable by the processor to:
receive a service via a component carrier, wherein the component carrier is in an unlicensed radio frequency spectrum band;
determine that a clear channel assessment failed for a time interval associated with the component carrier; and
measure one or more signals transmitted on the component carrier to estimate channel state information of the component carrier in the unlicensed radio frequency spectrum band, the measure triggered when it is determined that the clear channel assessment failed.

27. The apparatus of claim 26, wherein the instructions executable by the processor to determine that the clear channel assessment failed for the time interval further comprise instructions executable by the processor to:
determine that the clear channel assessment failed for a frame for the component carrier, wherein the frame is associated with the time interval.

28. The apparatus of claim 27, wherein the instructions are executable by the processor to:
aperiodically transmit the channel state information of the component carrier, wherein the one or more signals are measured during the frame for the component carrier.

29. The apparatus of claim 27, wherein the instructions are executable by the processor to:
omit an aperiodic transmission of the channel state information for one or more subframes of the frame for the component carrier.

30. A non-transitory computer-readable medium storing computer-executable code for wireless communications, the code executable by a processor to:
receive a service via a component carrier, wherein the component carrier is in an unlicensed radio frequency spectrum band;
determine that a clear channel assessment failed for a time interval associated with the component carrier; and
measure one or more signals transmitted on the component carrier to estimate channel state information of the component carrier in the unlicensed radio frequency spectrum band, the measure triggered when it is determined that the clear channel assessment failed.

* * * * *